(12) United States Patent
Mohamed et al.

(10) Patent No.: US 10,443,387 B2
(45) Date of Patent: Oct. 15, 2019

(54) TURBINE WHEEL WITH REDUCED INERTIA

(71) Applicant: HONEYWELL INTERNATIONAL INC., Morris Plains, NJ (US)

(72) Inventors: Ashraf Mohamed, Torrance, CA (US); William Joseph Smith, Gardena, CA (US); Wagner Magalhaes, Torrance, CA (US); Derek Cooper, Redondo Beach, CA (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 182 days.

(21) Appl. No.: 15/604,369

(22) Filed: May 24, 2017

(65) Prior Publication Data
US 2018/0340422 A1    Nov. 29, 2018

(51) Int. Cl.
*F01D 5/04*    (2006.01)
*F01D 5/02*    (2006.01)
(Continued)

(52) U.S. Cl.
CPC ............ *F01D 5/04* (2013.01); *F01D 5/02* (2013.01); *F01D 5/027* (2013.01); *F01D 5/048* (2013.01);
(Continued)

(58) Field of Classification Search
CPC ... F01D 5/04; F01D 5/02; F01D 5/027; F01D 5/048; F01D 5/14; F01D 5/147; F02C 6/12; F05D 2220/40
(Continued)

(56) References Cited

U.S. PATENT DOCUMENTS 1,959,703 A * 5/1934 Birmann .............. F01D 5/048
                                                    415/115
3,040,670 A * 6/1962 Schenck ............ F04D 29/2266
                                                    415/109
(Continued)

FOREIGN PATENT DOCUMENTS

EP    2410126 A1    1/2012
EP    2960463 A1    12/2015
JP    10131704 A    5/1998

OTHER PUBLICATIONS

European Patent and Trademark Office, European Search Report for Application No. 18172211.7, dated Dec. 19, 2018.
(Continued)

*Primary Examiner* — J. Todd Newton
(74) *Attorney, Agent, or Firm* — Lorenz & Kopf, LLP

(57) ABSTRACT

A turbine wheel for a turbocharger is provided. The turbine wheel includes a plurality of blades and a mid-plane is defined between a pressure side and a suction side of adjacent blades. Each of the blades has a leading edge, and is coupled to the wheel hub along a respective blade hub camber line. The wall has a first radii at the leading edge that extends for a first circumferential distance adjacent to the suction side. The first circumferential distance is at least 12% of a circumferential distance that extends between adjacent blades. The wheel hub includes a plurality of scallops defined through the wall. Each of the scallops is asymmetrical about the mid-plane. For each of the scallops, the wall has a second minimum radii defined offset from the mid-plane toward the suction side and a third minimum radii defined offset from the mid-plane toward the pressure side.

19 Claims, 18 Drawing Sheets

(51) Int. Cl.
*F01D 5/14* (2006.01)
*F02C 6/12* (2006.01)

(52) U.S. Cl.
CPC ............... *F01D 5/14* (2013.01); *F01D 5/147* (2013.01); *F02C 6/12* (2013.01); *F05D 2220/40* (2013.01)

(58) Field of Classification Search
USPC ............ 416/179, 172, 183, 185, 186 R, 234, 416/193 A, 244 R, 244 A
See application file for complete search history.

(56) References Cited

U.S. PATENT DOCUMENTS

| | | | | |
|---|---|---|---|---|
| 4,335,997 | A * | 6/1982 | Ewing | F01D 5/048 416/185 |
| 5,061,154 | A * | 10/1991 | Kington | F01D 5/048 29/889 |
| 5,605,444 | A * | 2/1997 | Paton | F04D 29/2277 416/183 |
| 6,553,763 | B1 * | 4/2003 | Callas | F01D 5/048 415/184 |
| 7,189,062 | B2 * | 3/2007 | Fukizawa | F04D 25/04 416/185 |
| 7,481,625 | B2 | 1/2009 | Kim | |
| 7,578,656 | B2 * | 8/2009 | Higgins | F01D 5/02 416/244 A |
| 2004/0115044 | A1 * | 6/2004 | Osako | F01D 5/048 415/143 |
| 2006/0039791 | A1 * | 2/2006 | Kim | F01D 5/048 416/228 |
| 2011/0280728 | A1 * | 11/2011 | Simpson | F01D 5/048 416/185 |
| 2013/0004321 | A1 * | 1/2013 | Yokoyama | F01D 1/28 416/223 R |
| 2013/0017090 | A1 * | 1/2013 | Duong | F01D 5/048 416/183 |
| 2013/0017091 | A1 * | 1/2013 | Duong | F01D 5/048 416/193 A |
| 2014/0178217 | A1 * | 6/2014 | Kares | F01D 5/048 417/405 |
| 2015/0086395 | A1 * | 3/2015 | Dextraze | F04D 29/4206 417/405 |
| 2016/0003059 | A1 * | 1/2016 | Otsubo | F01D 5/027 416/241 R |
| 2016/0168999 | A1 * | 6/2016 | Takabatake | F01D 5/027 416/223 A |
| 2016/0265359 | A1 * | 9/2016 | Annati | F01D 5/027 |
| 2018/0340422 | A1 * | 11/2018 | Mohamed | F01D 5/02 |

OTHER PUBLICATIONS

Cox, Graham, Jason Wu and Ben Finnigan, "A Study on the Flow Around the Scallops of a Mixed-Flow Turbine and its Effect on Efficiency," Proceedings of ASME, May 14-17, 2007, Downloaded From: http://proceedings.asmedigitalcollection.asme.org/ on Sep. 9, 2016 Terms of Use: http://www.asme.org/about-asme/terms-of-use.

* cited by examiner

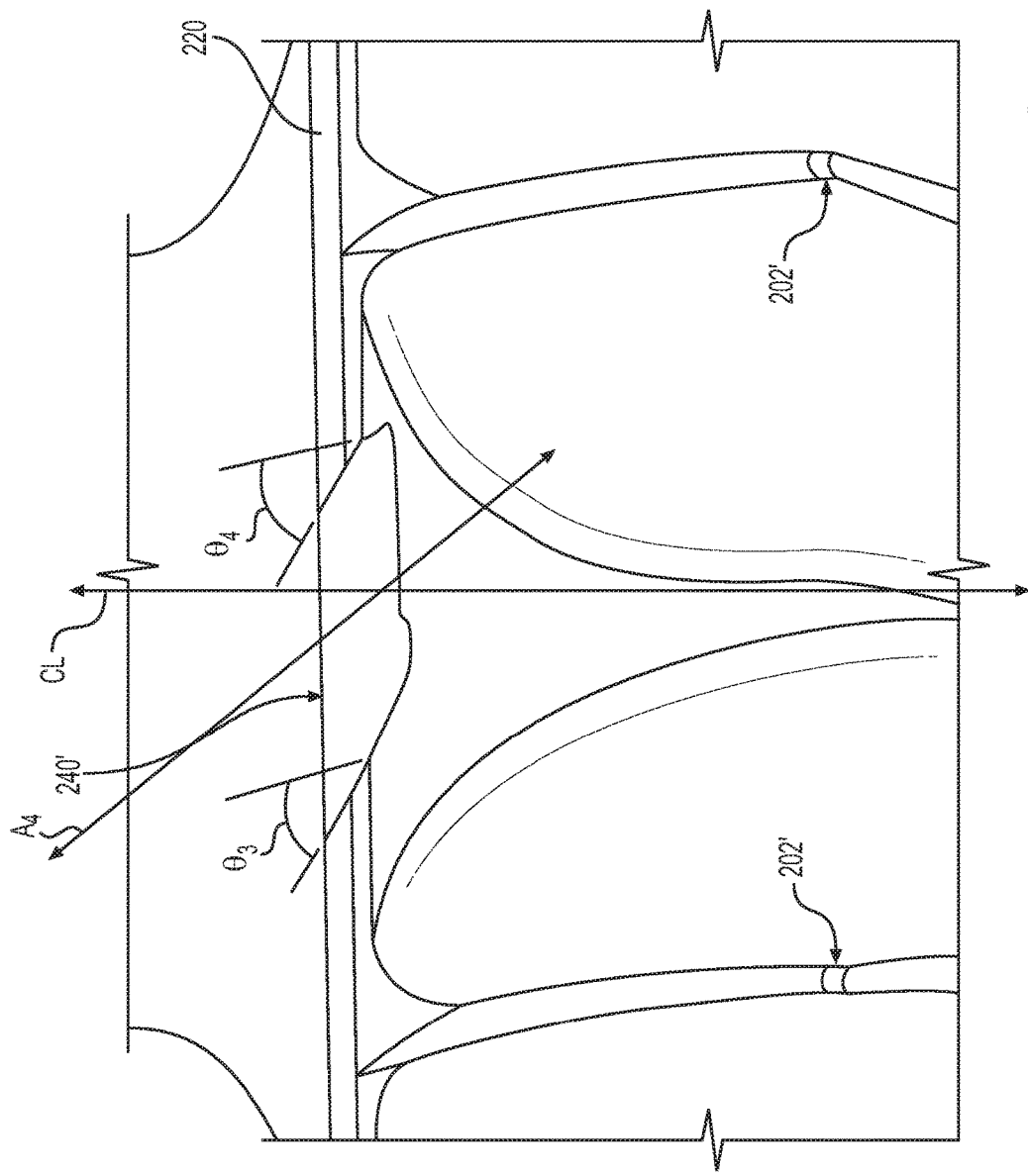

US 10,443,387 B2

TURBINE WHEEL WITH REDUCED INERTIA

TECHNICAL FIELD

The present disclosure generally relates to turbomachinery for use with internal combustion engines, and more particularly relates to a turbine wheel with reduced inertia.

BACKGROUND

Turbochargers may be employed with an internal combustion engine to increase efficiency and improve power output. Generally, the turbocharger includes a turbine wheel in fluid communication with exhaust flow from the internal combustion engine. The exhaust flow spins the turbine wheel, which in turn may spin a compressor to pressurize intake air for the internal combustion engine. The pressurized intake air results in improved efficiency and improved power output. However, based on the rotational inertia of the turbine wheel, it may take a period of time for the turbine wheel to reach an operating speed that results in improved power output.

Accordingly, it is desirable to provide a turbine wheel that has a reduced rotational inertia, which enables the turbine wheel to spin in a shorter period of time. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a turbine wheel for a turbocharger. The turbine wheel includes a plurality of blades having a pressure side and a suction side. Each of the plurality of blades is coupled to a wheel hub along a root of the blade such that the pressure side of each one of the plurality of blades faces the suction side of another one of the plurality of blades about the wheel hub. A mid-plane is defined between the pressure side and the suction side of adjacent ones of the plurality of blades. Each of the plurality of blades has a leading edge that terminates at a wall of the wheel hub, and each of the plurality of blades is coupled to the wheel hub along a respective blade hub camber line. The wall has a first radii at the leading edge of each of the plurality of blades that extends for a first circumferential distance adjacent to the suction side of each of the plurality of blades. The first circumferential distance is at least 12% of a circumferential distance that extends between the adjacent ones of the plurality of blades. The wheel hub includes a plurality of scallops defined through the wall of the wheel hub between the adjacent ones of the plurality of blades. Each of the plurality of scallops is asymmetrical about the mid-plane. For each of the plurality of scallops, the wall of the wheel hub has a second minimum radii defined offset from the mid-plane toward the suction side of a respective one of the plurality of blades and a third minimum radii defined offset from the mid-plane toward the pressure side of another one of the plurality of blades. The second minimum radii is less than the third minimum radii and the first radii.

In various embodiments, also provided is a turbine wheel for a turbocharger. The turbine wheel includes a plurality of blades having a pressure side and a suction side. Each of the plurality of blades is coupled to a wheel hub along a root of the blade such that the pressure side of each one of the plurality of blades faces the suction side of another one of the plurality of blades about the wheel hub. A mid-plane is defined between the pressure side and the suction side of adjacent ones of the plurality of blades. Each of the plurality of blades has a leading edge that terminates at a wall of the wheel hub, and each of the plurality of blades is coupled to the wheel hub along a respective blade hub camber line. The wall has a first radii at the leading edge of each of the plurality of blades, and the wall extends from the leading edge of each of the plurality of blades adjacent to the suction side toward the mid-plane at the first radii for a first circumferential distance. The first circumferential distance is less than 120% of a second circumferential distance defined between the blade hub camber line of each of the plurality of blades along the suction side and the mid-plane of each of the plurality of blades. The first circumferential distance is at least 12% of a circumferential distance that extends between the adjacent ones of the plurality of blades. The wheel hub includes a plurality of scallops defined through the wall of the wheel hub between the adjacent ones of the plurality of blades. Each of the plurality of scallops is asymmetrical about the mid-plane. For each of the plurality of scallops, the wall of the wheel hub has a second minimum radii defined offset from the mid-plane toward the suction side of a respective one of the plurality of blades and a third minimum radii defined offset from the mid-plane toward the pressure side of another one of the plurality of blades. The second minimum radii is less than the third minimum radii and the first radii.

DESCRIPTION OF THE DRAWINGS

The exemplary embodiments will hereinafter be described in conjunction with the following drawing figures, wherein like numerals denote like elements, and wherein:

FIG. 9B is a detail perspective view of the scallop of FIG. 5 defined through the wheel hub of the turbine wheel of FIG. 1 at a third offset angle and a fourth offset angle relative to a center line of the wheel hub;

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of turbine wheel or a compressor wheel that would benefit from a reduced rotational inertia, and that the radial-flow turbine wheel described herein for use with an internal combustion engine is merely one exemplary embodiment according to the present disclosure. Moreover, while the turbine wheel is described herein as being used with a turbocharger of an internal combustion engine onboard a mobile platform or vehicle, such as a bus, motorcycle, train, motor vehicle, marine vessel, aircraft, rotorcraft and the like, the various teachings of the present disclosure can be used with an internal combustion engine or with a radial turbine associated with a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

Figure 1:
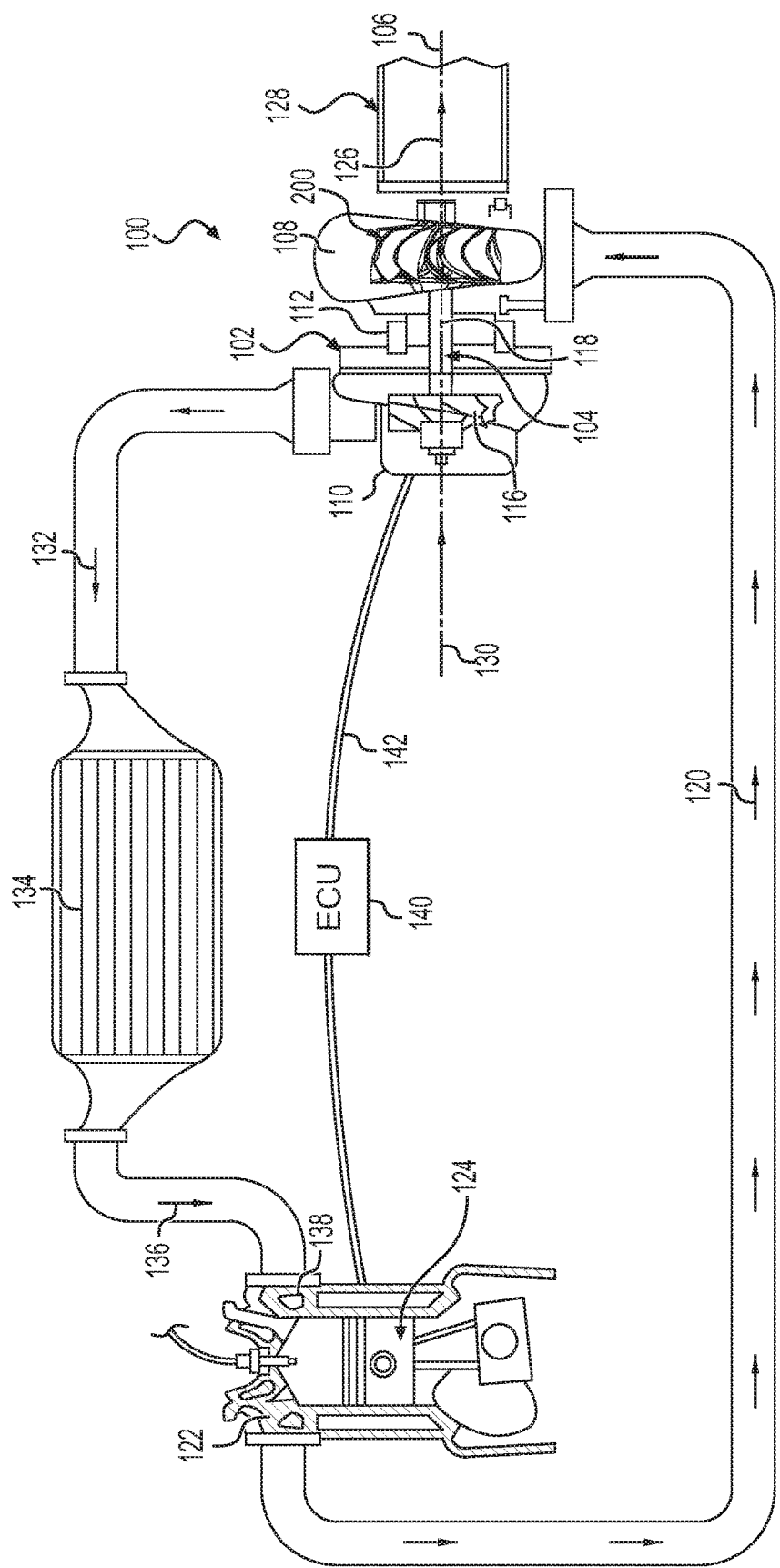
FIG. 1 is a schematic view of a turbocharger of a vehicle, which is connected to an engine and an intercooler, the turbocharger including a turbine wheel with reduced rotational inertia according to the various teachings of the present disclosure.

FIG. 1 provides a schematic view of a turbocharger 100 that includes a turbocharger housing 102 and a rotor 104. The rotor 104 is configured to rotate within the turbocharger housing 102 about an axis of rotor rotation or axis of rotation 106. The rotor 104 may be supported for rotation about the axis of rotation 106 via one or more bearings (not shown).

In some embodiments, the rotor 104 may be rotationally supported by thrust bearings and a plurality of journal bearings. Alternatively, other bearings may be included.

As shown in the illustrated embodiment, the turbocharger housing 102 may include a turbine housing 108, a compressor housing 110, and a bearing housing 112. The bearing housing 112 may be disposed between the turbine and compressor housings 108, 110. Also, in some embodiments, the bearing housing 112 may contain the bearings of the rotor 104.

Additionally, the rotor 104 includes a turbine wheel 200, a compressor wheel 116, and a shaft 118. The turbine wheel 200 is located substantially within the turbine housing 108, and includes a reduced rotational inertia as will be discussed in further detail below. The compressor wheel 116 is located substantially within the compressor housing 110. The shaft 118 extends along the axis of rotation 106, through the bearing housing 112, to connect the turbine wheel 200 to the compressor wheel 116. Accordingly, the turbine wheel 200 and the compressor wheel 116 rotate together about the axis of rotation 106.

It will be appreciated that the turbocharger 100 may have one of a variety of configurations that may or may not correspond with the illustrated embodiment. For example, the turbocharger 100 may be configured with a wastegate, a variable nozzle, or other features.

The turbine housing 108 and the turbine wheel 200 cooperate to form a turbine (i.e., turbine section, turbine stage) configured to circumferentially receive a high-pressure and high-temperature exhaust gas stream 120 from an engine, e.g., from an exhaust manifold 122 of an internal combustion engine 124. The turbine wheel 200 (and thus the rotor 104) is driven in rotation around the axis of rotation 106 by the high-pressure and high-temperature exhaust gas stream 120, which becomes a lower-pressure and lower-temperature exhaust gas stream 126 as it expands across the turbine stage and is axially released into an exhaust system 128.

The compressor housing 110 and compressor wheel 116 form a compressor stage. The compressor wheel 116, being driven in rotation by the exhaust-gas driven turbine wheel 200, is configured to compress axially received input air (e.g., ambient air 130, or already-pressurized air from a previous-stage in a multi-stage compressor) into a pressurized air stream 132 that is ejected circumferentially from the compressor. Due to the compression process, the pressurized air stream is characterized by an increased temperature, over that of the input air.

In some embodiments, the pressurized air stream 132 may be channeled through an air cooler 134 (i.e., intercooler), such as a convectively cooled charge air cooler. The air cooler 134 may be configured to dissipate heat from the pressurized air stream 132, increasing its density. The resulting cooled and pressurized output air stream 136 is channeled into an intake manifold 138 on the internal combustion engine 124, or alternatively, into a subsequent-stage, in-series compressor. The operation of the system is controlled by an ECU 140 (engine control unit) that connects to the remainder of the system via a communication medium 142, such as a CAN bus.

Figure 2:
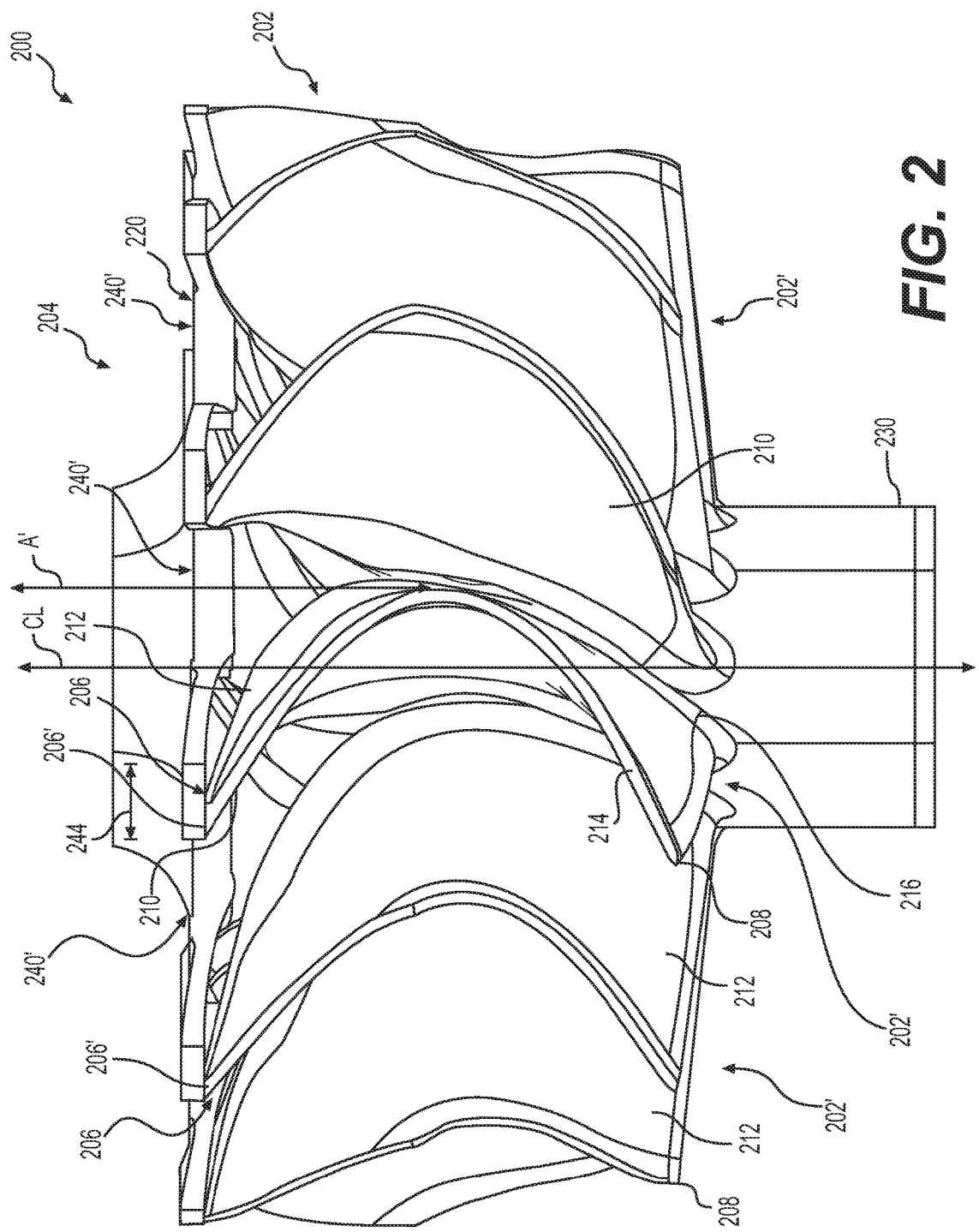
FIG. 2 is a top view of the turbine wheel of FIG. 1.

Referring now to FIG. 2, the turbine wheel 200 of the turbocharger 100 is shown. The turbine wheel 200 includes a plurality of blades 202 and a wheel hub 204. The turbine wheel 200 is composed of a metal or metal alloy, and may be cast, forged, machined, selective metal sintered, etc. In certain embodiments, the turbine wheel 200 may be composed of a composite material or other non-metallic materials, which are cast, molded, printed, etc. In one embodiment, the turbine wheel 200 is composed of a metal or metal alloy and is formed through investment casting. The plurality of blades 202 may be integrally formed with the wheel hub 204, or may be coupled to the wheel hub 204 through a suitable processing step, such as hot isostatic pressing, etc. The wheel hub 204 of the turbine wheel 200 has a predetermined or predefined diameter and a predefined number of blades 202 based on the operating specifications and requirements of the turbocharger 100 for use with the internal combustion engine 124.

The plurality of blades 202 are spaced apart about a perimeter or circumference of the wheel hub 204. Each blade 202' of the plurality of blades 202 includes a leading edge 206, a trailing edge 208, a pressure side 210, a suction side 212, a tip 214 and a root 216. The leading edge 206 is in fluid communication with the exhaust gas, and corresponds to the inducer of the turbine wheel 200. The leading edge 206 has a hub end 206' that is adjacent to a portion or wall 220 of the wheel hub 204. In this example, the hub end 206' terminates at the wall 220 of the wheel hub 204. The trailing edge 208 is substantially opposite the leading edge 206, and corresponds to the exducer of the turbine wheel 200. The exhaust gas flows from the leading edge 206 to the trailing edge 208.

The pressure side 210 is defined along a first concave outer wall of the respective blade 202'. The suction side 212 is opposite the pressure side 210, and is defined along a second convex outer wall of the respective blade 202'. The outer walls cooperate to define an airfoil shape for the respective blade 202'. The tip 214 extends from the leading edge 206 to the trailing edge 208. The root 216 is substantially opposite the tip 214.

Figure 3:
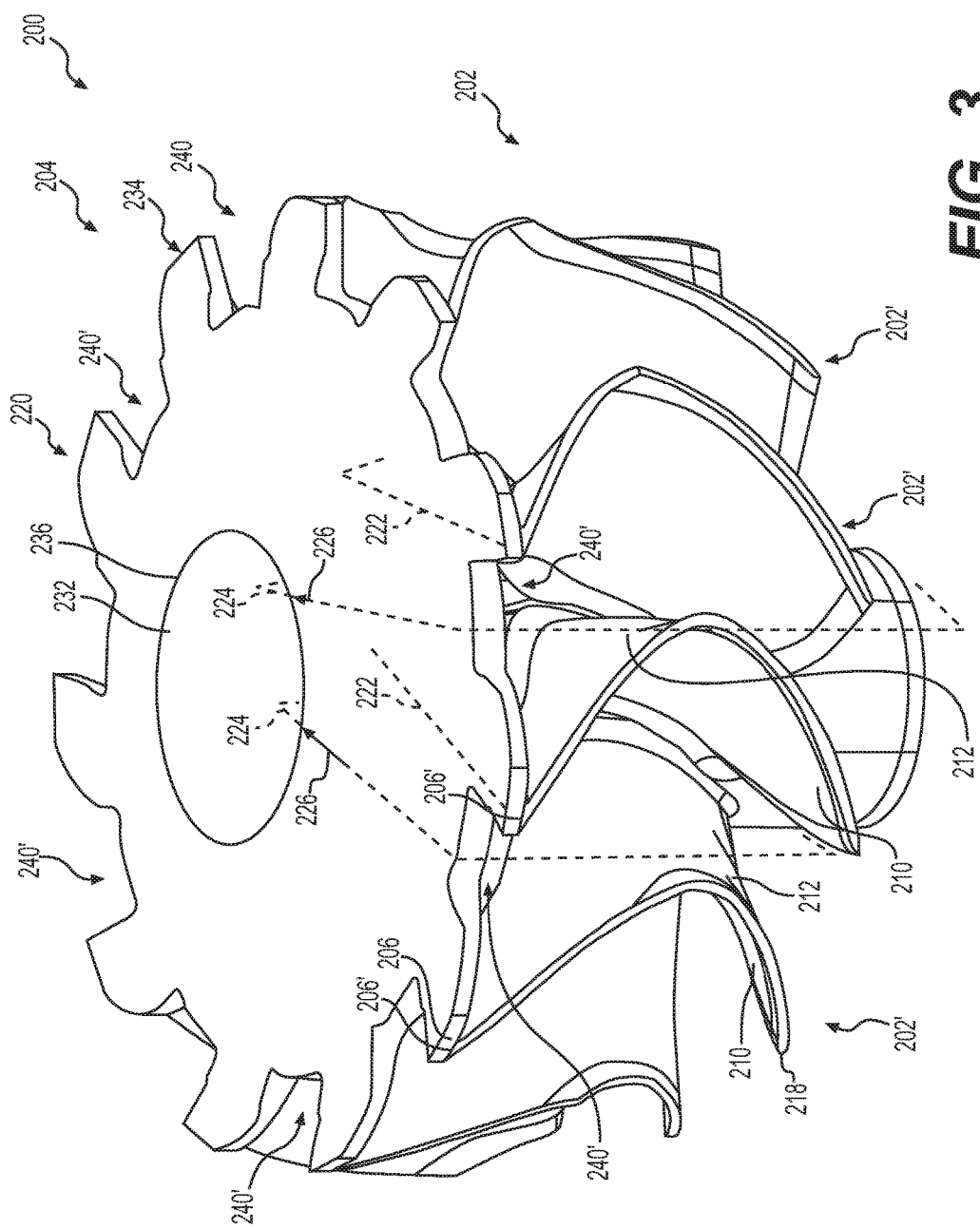
FIG. 3 is a perspective view of the turbine wheel of FIG. 1, which illustrates a wheel hub of the turbine wheel that provides the reduced rotational inertia.
Figure 3A:
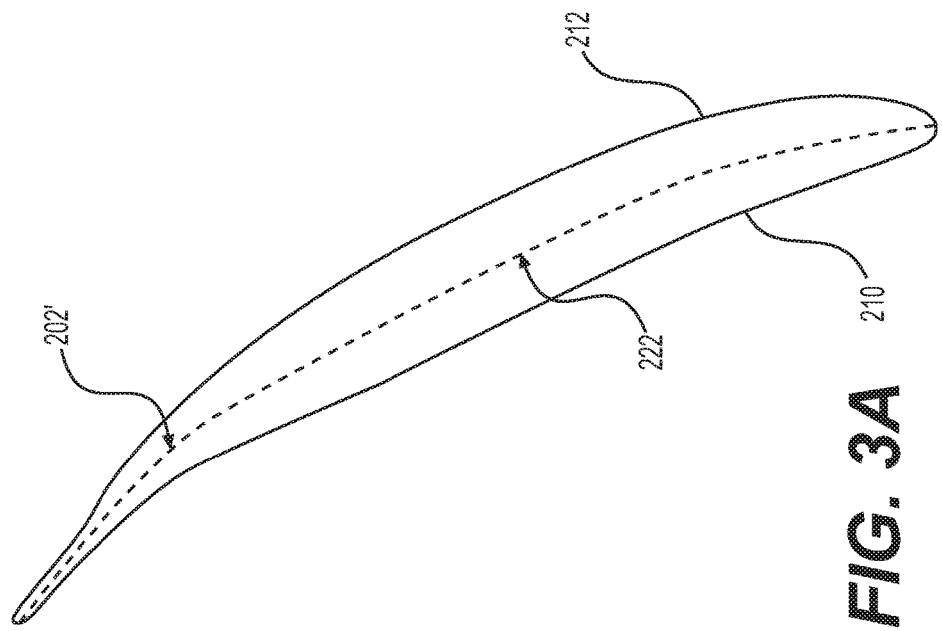
FIG. 3A is perspective view of a blade of the turbine wheel of FIG. 1 along with a cross-sectional view of the blade hub.
Figure 3A:
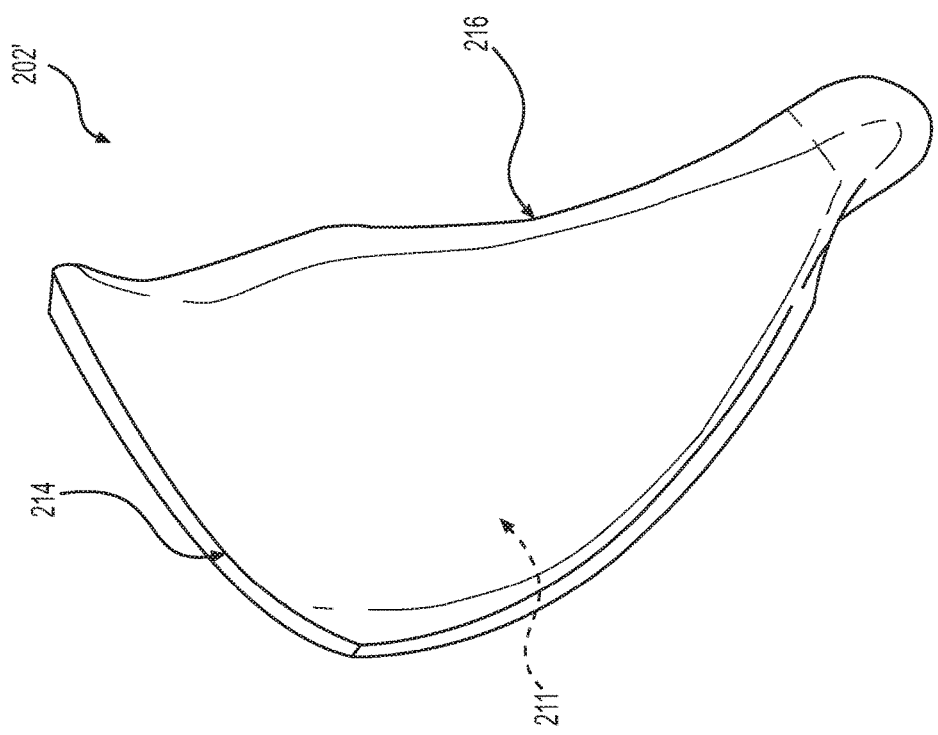
Figure 3B:
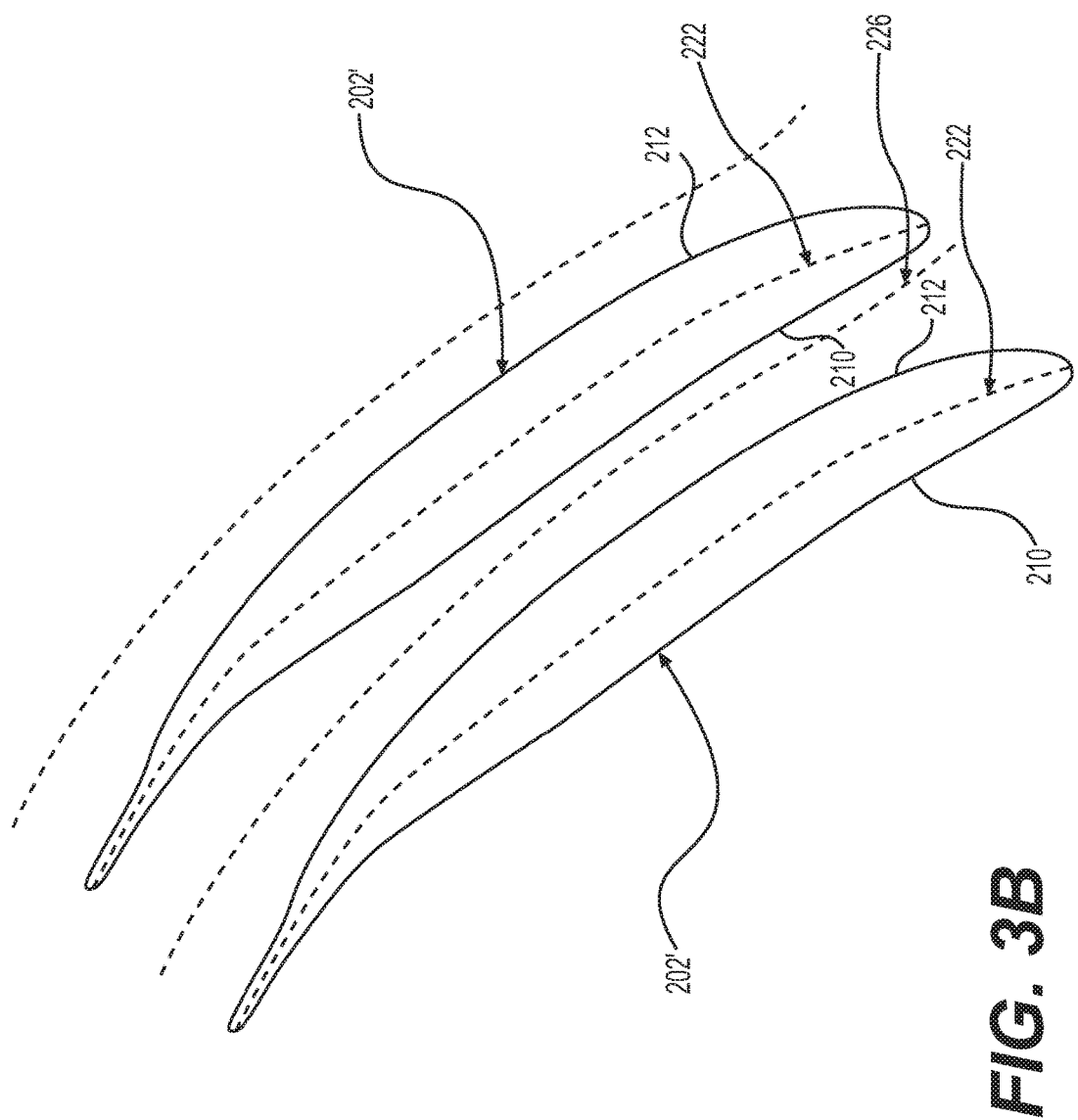
FIG. 3B is a blade-to-blade view of adjacent blade hub cross-sections of the turbine wheel of FIG. 1.

With reference to FIG. 3, each of the blades 202' is coupled to or attached to the wall 220 of the wheel hub 204 along a blade hub camber line 222. The blade hub camber line 222 is also defined by a plurality of mid-points along a surface of the respective blade 202' at the intersection of the root 216 of the blade 202' with the wheel hub 204. A blade hub interface is defined at the intersection of the root 216 with the wheel hub 204. Each of the plurality of mid-points are defined at a location that is in the middle between the pressure side 210 and the suction side 212 of the respective blade 202' along the intersection of the blade 202' with the wheel hub 204. Stated another way, with reference to FIG. 3A, a blade camber surface 211 is defined between the pressure side 210 and the suction side 212. The intersection of the blade camber surface 211 with a surface of the wheel hub 204 defines the blade hub camber line 222, which is a line of symmetry of the root 216 of the blade 202'. The root 216 is defined by the intersection of the pressure side 210 and the suction side 212 with the surface of the wheel hub 204. With reference back to FIG. 3, it should be noted that for ease of illustration, the blade hub camber line 222 is shown for only two of the blades 202' in FIG. 3, but each of the blades 202' includes the blade hub camber line 222. The view in FIG. 3B is a blade-to-blade view of adjacent blade hub cross-sections, which illustrate the intersection of the root 216 with the surface of the wheel hub 204.

In addition, each blade 202' of the plurality of blades 202 defines a mid-plane 224. The mid-plane 224 is defined in the middle between adjacent pressure sides 210 and suction sides 212 of the plurality of blades 202. A mid-line 226 is defined by the mid-plane 224. Stated another way, with reference to FIG. 3B, in addition to the blade hub camber line 222 of each blade 202', a middle line between two adjacent blade hub camber lines 222 defines the mid-line 226, which is a line of periodicity between two blades 202'. The mid-line 226 between each adjacent pair of blades 202' is constructed by revolving the blade hub camber line 222 by an angle equal to half the spaced angle between every two blades 202'. With reference back to FIG. 3, it should be noted that for ease of illustration, the mid-plane 224 and the mid-line 226 is shown for only two of the blades 202' in FIG. 3, but each pair of blades 202' of the plurality of blades 202 includes the mid-plane 224 and the mid-line 226.

As discussed, each blade 202' of the plurality of blades 202 is coupled to the wheel hub 204 such that the pressure side 210 of one of the blades 202' is facing a suction side 212 of an adjacent one of the blades 202'. The wheel hub 204 includes a hub 230 and the wall 220. A flow channel for the exhaust gas through the turbine wheel 200 may be bounded by two adjacent blades 202', a portion of the hub 230 and a section of the wall 220. The hub 230 defines a bore 232 that extends along a central axis. The central axis is substantially coaxial with the axis of rotation 106 (FIG. 1). The shaft 118 is received within the bore 232 to couple the turbine wheel 200 to the shaft 118. (FIG. 1). A portion of the hub 230 is radially extended in a plane perpendicular to the central axis of the bore 232 to define the wall 220. It should be noted that while in this example, the wall 220 is defined by the portion of the hub 230 radially extended in the plane perpendicular to the central axis of the bore 232, the present disclosure is not so limited. In this regard, the portion of the hub 230 may be radially extended along a plane that is oblique to the central axis of the bore 232 such that the wall 220 is defined at an angle or an incline relative to the central axis of the bore 232.

Figure 4:
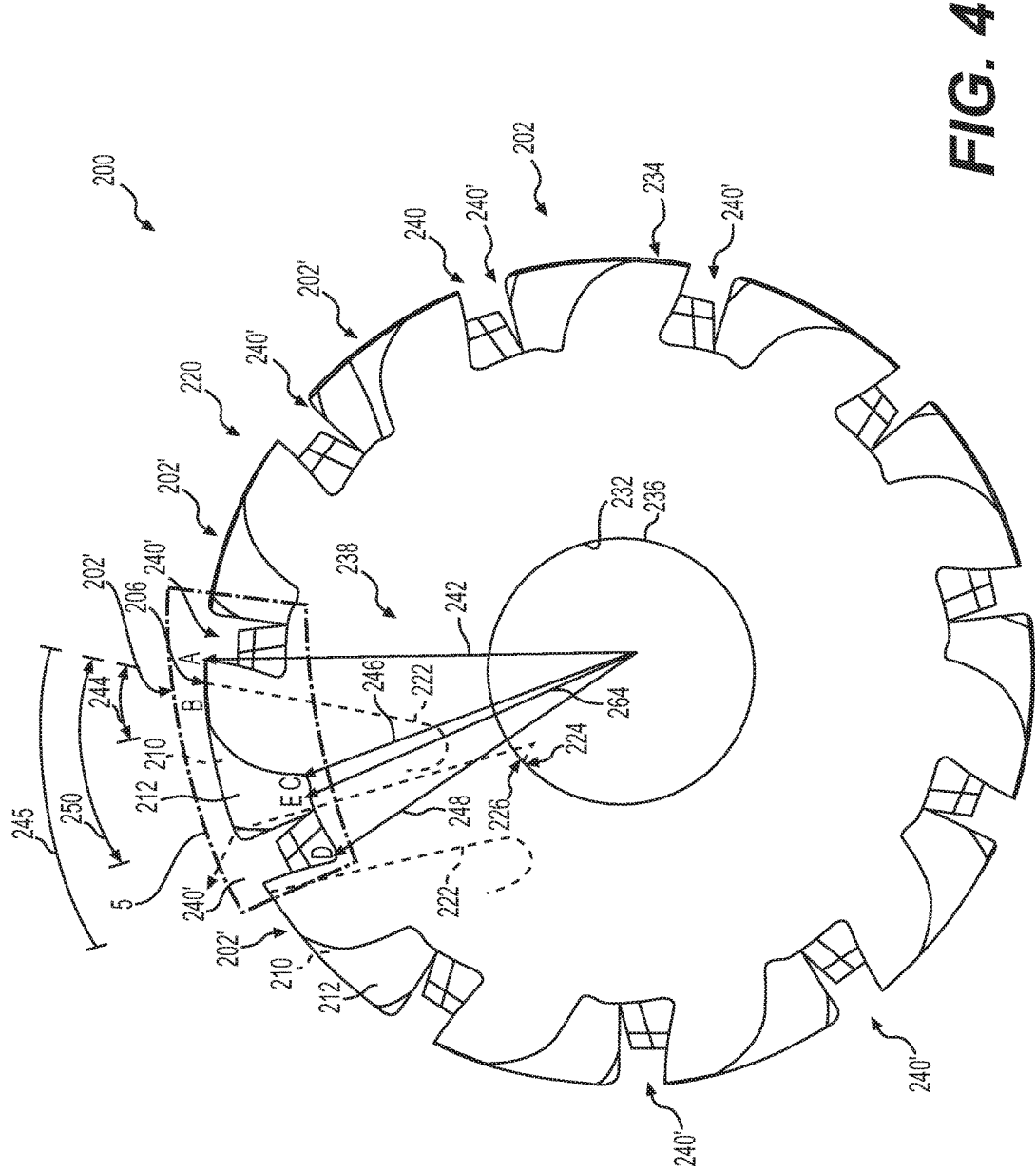
FIG. 4 is an end view of the turbine wheel of FIG. 1, which illustrates a plurality of scallops of the wheel hub.

The wall 220 is annular, and has an outer perimeter or outer circumference 234 and an inner perimeter or inner circumference 236. With reference to FIG. 4, the wall 220 is defined by a plurality of radii 238, each associated with one scallop 240' of a plurality of scallops 240 defined through the wall 220 of the wheel hub 204 at the outer circumference 234. As can be appreciated, each of the plurality of radii 238 and each of the plurality of scallops 240 are the same, and thus, the plurality of radii 238 of only one scallop 240' will be described in detail herein. It should be understood, however, that while the plurality of scallops 240 are described and illustrated herein as being the same, one or more scallops of the plurality of scallops 240 may have a plurality of radii 238 that are different than a reminder of the plurality of scallops 240. Moreover, while the wall 220 of the wheel hub 204 is illustrated and described herein as having the outer circumference 234 that coincides with the leading edge 206 of each of the blades 202', it will be understood that in various embodiments the outer circumference 234 of the wall 220 need not coincide with the leading edge 206 of each of the blades 202', rather, the wall 220 may be offset from the leading edge 206 of each of the blades 202', for example.

In this example, a first radius (first radii) 242 is defined at the hub end 206' of the leading edge 206 of each of the blades 202' and terminates at a point A. The wall 220 of the wheel hub 204 extends for the first radius 242 for a first circumferential distance 244. As shown, the wall 220 extends at the first radius 242 from the point A to a point B. In one example, the first circumferential distance 244 is about 12% to about 60% of a circumferential distance 245 that extends between adjacent blades 202'. Thus, the first circumferential distance 244 is at least 12% of the circumferential distance 245. The wall 220 of the wheel hub 204 also has a second radius (second minimum radii) 246 defined so as to be offset from the mid-plane 224, and thus, the mid-line 226 toward the suction side 212. The second radius 246 terminates at a point C. The wall 220 of the wheel hub 204 also has a third radius (third minimum radii) 248 defined so as to be offset from the mid-plane 224, and thus, the mid-line 226 toward the pressure side 210. The third radius 248 terminates at a point D.

Generally, the first radius 242 is greater than the second radius 246 and the third radius 248. The third radius 248 is less than the first radius 242 and greater than the second radius 246. The second radius 246 is a minimum radius for the scallop 240' and the wall 220 of the wheel hub 204, and is less than the first radius 242 and the third radius 248. In one example, the first circumferential distance 244 is between about 25% to about 120% of a second circumferential distance 250 defined between the blade hub camber line 222 and the mid-line 226. Stated another way, the wall 220 of the wheel hub 204 extends at the first radius 242 from the hub end 206' adjacent to the blade hub camber line 222 of a respective blade 202' of the plurality of blades 202 along the suction side 212 toward the mid-plane 224 for the first circumferential distance 244, which is between about 25% and about 120% of the second circumferential distance 250 that extends between the respective blade hub camber line 222 along the suction side 212 and the mid-plane 224.

Figure 5:
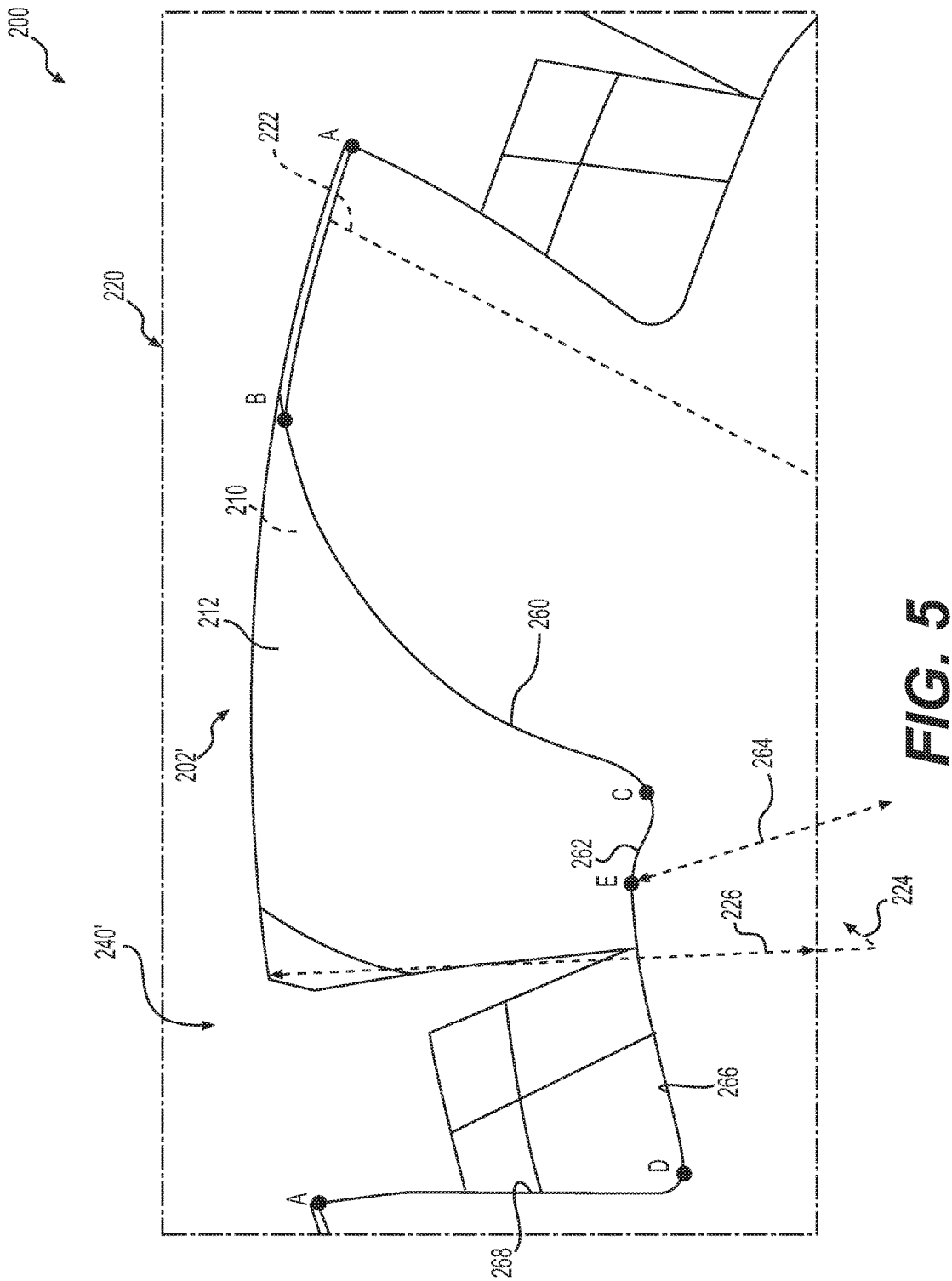
FIG. 5 is a detail view of a scallop of the plurality of scallops of the wheel hub of the turbine wheel of FIG. 1, taken at 5 in FIG. 4.

Each of the radii 242, 246, 248 cooperates to define the respective scallop 240' of the plurality of scallops 240. The plurality of scallops 240 are defined about the outer circumference 234 of the wheel hub 204 through the wall 220. Each of the plurality of scallops 240 is asymmetric with respect to the mid-plane 224. With reference to FIG. 5, the respective scallop 240' of the plurality of scallops 240 is shown in greater detail. In one example, each of the scallops 240' are formed with the wall 220 of the wheel hub 204 as the turbine wheel 200 is manufactured, such as through investment casting, etc. In this example, the scallop 240' is defined from point B to point A. Stated another way, the first radius 242 (FIG. 4) defines an outermost perimeter or circumference of the wall 220 of the wheel hub 204, and the scallop 240' is defined as a cut-out through this outermost perimeter or circumference of the wall 220 of the wheel hub 204.

The scallop 240' transitions from the point B to the point C via a curved or arcuate surface 260. The scallop 240' transitions from the point C to a point E via an incline surface 262. The point E is at a fourth radius (radii) 264, which is greater than the second radius 246 and the third radius 248. The fourth radius 264 is less than the first radius 242 (FIG. 4). The scallop 240' transitions from the point E to the point D via a sloped surface 266. The sloped surface 266 crosses the mid-plane 224. The point D transitions to the point A via a surface 268 that extends radially outward from the point D such that the surface 268 is substantially planar. Stated another way, each of the scallops 240' are defined by a plurality of segments, with the plurality of segments including a first segment or the arcuate surface 260, a second segment or the incline surface 262, a third segment or the sloped surface 266 and a fourth segment or the surface 268.

With reference to FIG. 2, each of the scallops 240' may be considered as defined by a two-dimensional shape that is defined or extruded through the wall 220 of the wheel hub 204. From this perspective, the scallop 240' is constructed by defining or extruding a curved two-dimensional shape between adjacent pairs of the blades 202' in a direction parallel to a center line CL of the hub 230 or along an axis A' substantially parallel to the center line CL such that the two-dimensional shape penetrates through the wall 220 of the wheel hub 204 to define the three-dimensional shape of the scallop 240'. In this example, the scallops 240' start on the outermost periphery of the wall 220 of the wheel hub 204 a predefined peripheral distance away (i.e. the first circumferential distance 244) from the suction side 212, and the first circumferential distance 244 is defined to extend from the blade hub camber line 222 at point A and extend towards the suction side 210 to terminate at point B. The shape of each of the scallops 240' drops from the point B to the second radius 246, which defines the inner most periphery of the scallop 240'. The second radius 246 is defined so as to be offset from the mid-line 226 between the blades 202' so that the inner most radius or the second radius 246 of the scallop 240' at point C is closer to the suction side 212 than to the pressure side 210. The scallop 240' also has the third radius 248 defined so as to be offset from the mid-line 226 toward the pressure side 210. The third radius 248 terminates at the point D.

In the example of a two-dimensional shape that is defined or extruded through the wall 220 of the wheel hub 204, the scallop 240' transitions from the point B to the point C via a curved or arcuate line, which when defined through the wall 220 forms the arcuate surface 260. The scallop 240' transitions from the point C to a point E via a second curved line, which when defined through the wall 220 of the wheel hub 204 forms the incline surface 262. The scallop 240' transitions from the point E to the point D via a third curved line, which when defined through the wall 220 forms the sloped surface 266. The curved line crosses the mid-line 226. The point D transitions to the point A via a fourth line, which when defined or extruded through the wall 220 forms the surface 268 that extends radially outward from the point D such that the surface 268 is substantially planar. Thus in this example, each of the scallops 240' are considered defined by a plurality of line segments, with the plurality of line segments including a first line segment or the curved line, a second line segment or the second curved line, a third line segment or the third curved line and a fourth line segment or the fourth line. Each of the plurality of line segments are defined through or extruded through the wall 220 of the wheel hub 204 in a direction substantially parallel to the centerline CL of the wheel hub 204 (i.e. along the axis A' of FIG. 2) to define the three-dimensional shape of each of the plurality of scallops 240.

With reference to FIG. 3, with the turbine wheel formed 200, such that the blades 202' are each coupled to the hub 230 and the wall 220 of the wheel hub 204, the plurality of scallops 240 are also defined through the wall 220. Generally, with reference to FIG. 5, each of the scallops 240 are formed in the wall 220 of the wheel hub 204 such that the wall 220 extends at the first radius 242 from the point A adjacent to the blade hub camber line 222 toward and adjacent to the suction side 212 of the respective blade 202' for the first circumferential distance 244 (to the point B). From the point B, the arcuate surface 260 is formed that terminates at the second radius 246 (point C; FIG. 3). From point C, the wall 220 of the wheel hub 204 is formed to define the incline surface 262 to the fourth radius 264 (point E). From point E, the wall 220 of the wheel hub 204 is formed to define the sloped surface 266 to the third radius 248 (point D; FIG. 3). From point D, the surface 268 is defined between point D and point A.

It should be noted that the configuration of the plurality of scallops 240 as described herein is not limited to the configuration shown in FIGS. 1-5. In this regard, with reference to FIG. 6, a turbine wheel 300 may include a plurality of scallops 340 defined through a wall 320 of a wheel hub 304. As the turbine wheel 300 may be similar to the turbine wheel 200 described with regard to FIGS. 1-5, the same reference numerals will be used to denote the same or similar components. In this example, the turbine wheel 300 may also be employed with the turbocharger 100 of FIG. 1.

The turbine wheel 300 includes the plurality of blades 202 and a wheel hub 304. The turbine wheel 300 is composed of a metal or metal alloy, and may be cast, forged, machined, selective metal sintered, etc. The plurality of blades 202 may be integrally formed with the wheel hub 304, or may be coupled to the wheel hub 304 through a suitable processing step, such as hot isostatic pressing, etc. The wheel hub 304 of the turbine wheel 300 has a predetermined or predefined diameter and a predefined number of blades 202 based on the operating specifications and requirements of the turbocharger 100 for use with the internal combustion engine 124.

The wheel hub 304 includes the hub 230 and the wall 320. A flow channel for the exhaust gas through the turbine wheel 300 may be bounded by two adjacent blades 202', a portion of the hub 230 and a portion of the wall 320 of the wheel hub 304. A portion of the hub 230 is radially extended in a plane perpendicular to the central axis of the bore 232 to define the wall 320 of the wheel hub 304.

Figure 7:
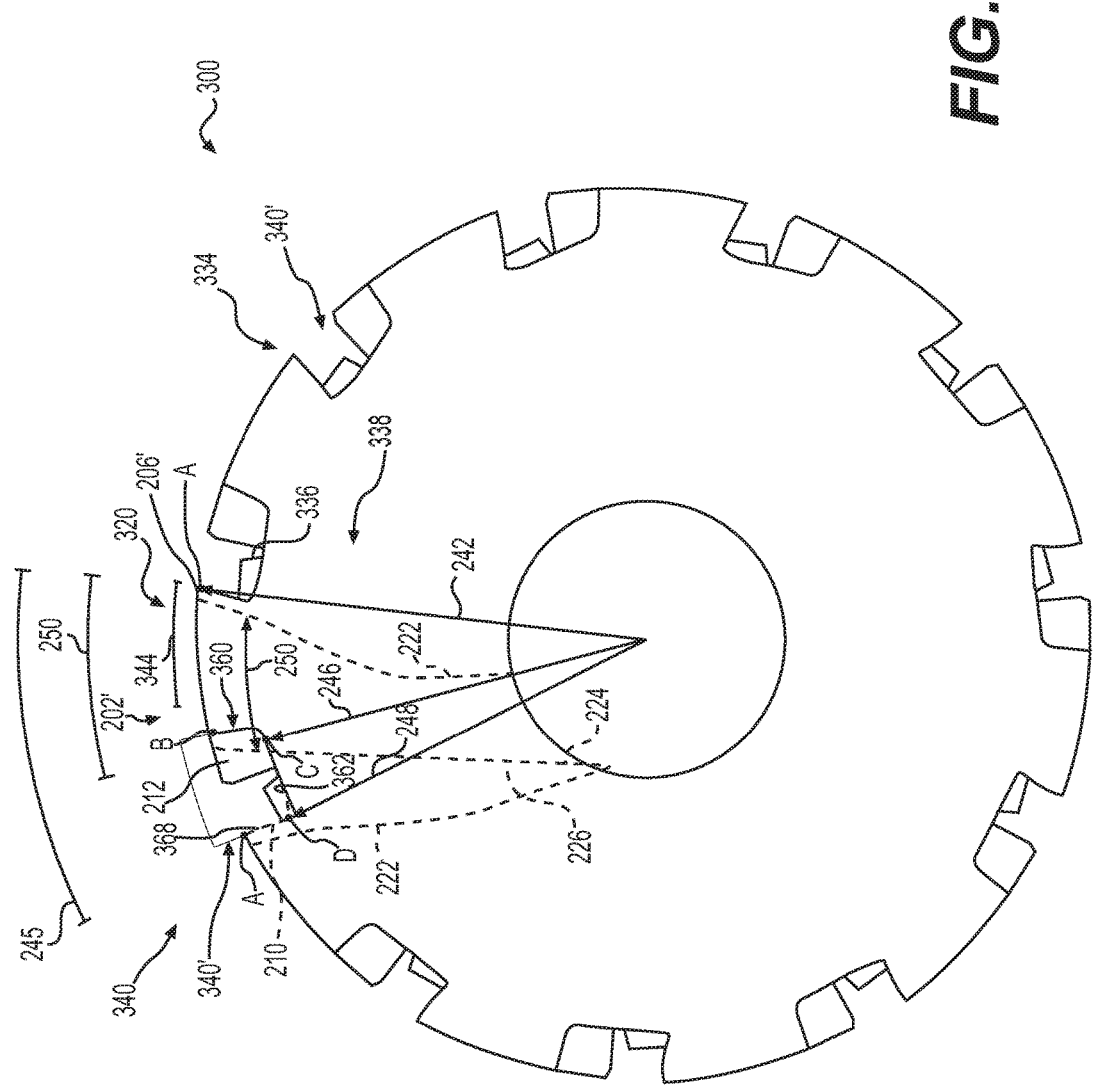
FIG. 7 is an end view of the turbine wheel of FIG. 6, which illustrates a plurality of scallops of the wheel hub.

The wall 320 of the wheel hub 304 is annular, and has an outer perimeter or outer circumference 334 and an inner perimeter or inner circumference 336. With reference to FIG. 7, the wall 320 of the wheel hub 304 is defined by a plurality of radii 338, each associated with one scallop 340' of the plurality of scallops 340 defined through the wall 320 at the outer circumference 334. As can be appreciated, each of the plurality of radii 338 and each of the plurality of scallops 340 are the same, and thus, the plurality of radii 338 of only one scallop 340' will be described in detail herein.

In this example, the wall 320 of the wheel hub 304 extends for the first radius 242 for a third circumferential distance 344. As shown, the wall 320 of the wheel hub 304 extends at the first radius 242 from the point A to a point B for the third circumferential distance 344. The wall 320 of the wheel hub 304 also has the second radius (second minimum radii) 246 defined so as to be offset from the mid-plane 224, and thus, the mid-line 226 toward the suction side 212. The wall 320 of the wheel hub 304 also has the third radius (third minimum radii) 248 defined so as to be offset from the mid-plane 224, and thus, the mid-line 226 toward the pressure side 210. In one example, the third circumferential distance 344 is less than about 120% of the second circumferential distance 250 defined between the blade hub camber line 222 and the mid-line 226. Stated another way, the wall 220 of the wheel hub 204 extends at the first radius 242 from the hub end 206' of a respective blade 202' of the plurality of blades 202 along or adjacent to the suction side 212 toward the mid-plane 224 for the third circumferential distance 344, which is less than about 120% of the second circumferential distance 250 that extends between the respective blade hub camber line 222 along the suction side 212 and the mid-plane 224. Generally, third circumferential distance 344 is about 12% to about 60% of the circumferential distance 245 that extends between adjacent blades 202'. Thus, the third circumferential distance 344 is at least 12% of the circumferential distance 245.

Each of the radii 242, 246, 248 cooperates to define the respective scallop 340' of the plurality of scallops 340. Each of the plurality of scallops 340 is asymmetric with respect to the mid-plane 224. In one example, each of the scallops 340' are formed with the wall 320 of the wheel hub 304 as the turbine wheel 300 is manufactured, such as through investment casting, etc. In this example, the scallop 340' is defined from point B to point A. Stated another way, the first radius 242 defines an outermost perimeter or circumference of the wall 320 of the wheel hub 304, and the scallop 340' is defined as a cut-out through this outermost perimeter or circumference of the wall 320 of the wheel hub 304.

The scallop 340' transitions from the point B to the point C via a substantially planar surface 360. The scallop 340' transitions from the point C to the point D via an incline surface 362. The point D transitions to the point A via a surface 368 that extends radially outward from the point D such that the surface 368 is substantially planar. Stated another way, each of the scallops 340' are defined by a plurality of segments, with the plurality of segments including a first segment or the planar surface 360, a second segment or the incline surface 362 and a third segment or the surface 368.

Figure 6:
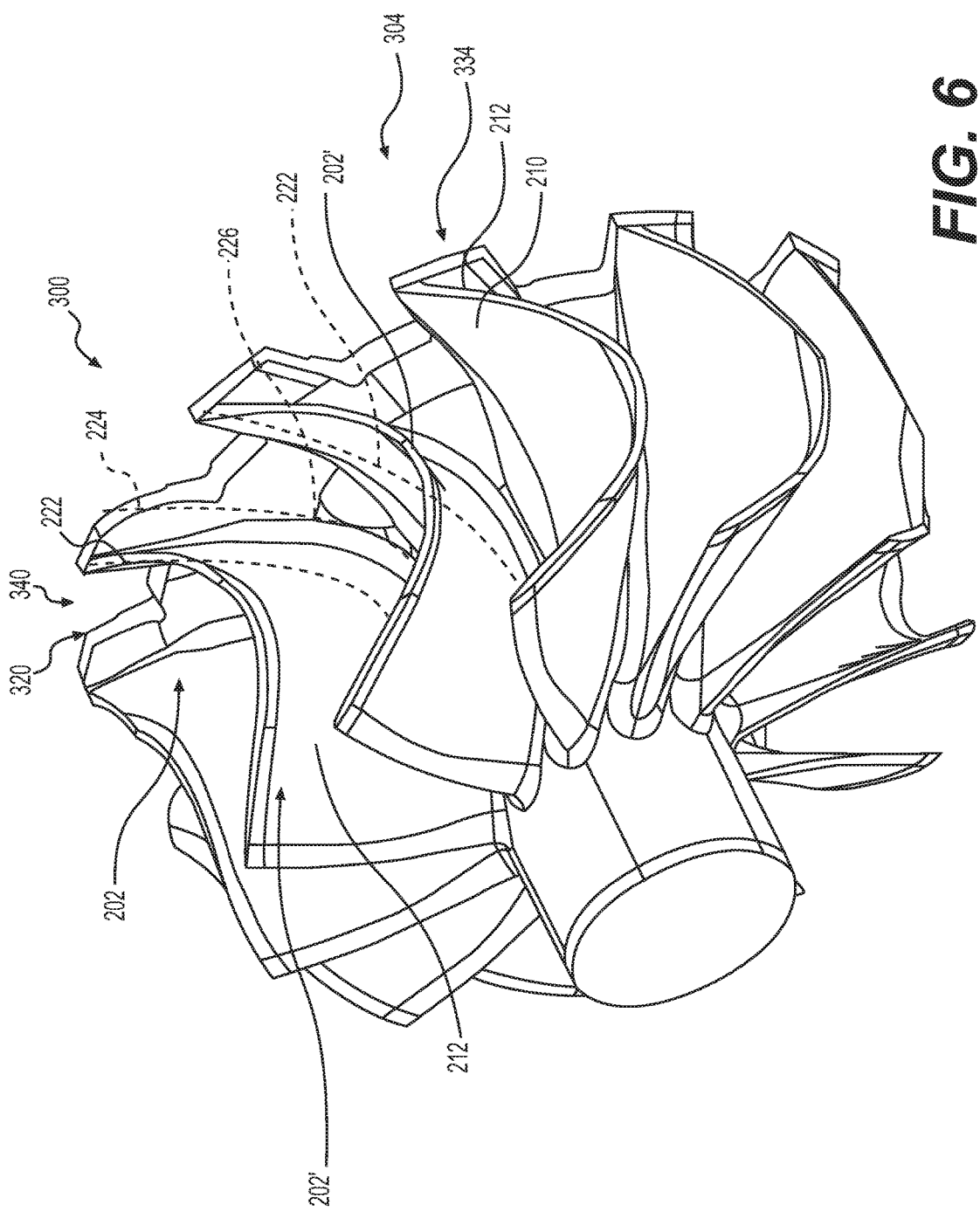
FIG. 6 is a perspective view of another exemplary turbine wheel for use with the turbocharger of FIG. 1, which illustrates a wheel hub of the turbine wheel that provides a reduced rotational inertia in accordance with various embodiments.

With reference to FIG. 6, with the turbine wheel formed 300, such that the blades 202' are each coupled to the hub 230 and the wall 320 of the wheel hub 304, the plurality of scallops 340 are also defined through the wall 320 of the wheel hub 304. Generally, with continued reference to FIG. 7, each of the scallops 340 are formed in the wall 320 of the wheel hub 304 such that the wall 320 of the wheel hub 304 extends at the first radius 242 from the point A adjacent to the blade hub camber line 222 toward and adjacent to the suction side 212 of the respective blade 202' for the third circumferential distance 344 (to the point B). From the point B, the wall 320 of the wheel hub 304 is formed to define the planar surface 360 that terminates at the second radius 246 (point C). From point C, the wall 320 of the wheel hub 304 is formed to define the incline surface 362 to the third radius 248 (point D). From point D, the surface 368 is defined between point D and point A.

The plurality of scallops 240, 340 defined in the wall 220, 320 of the wheel hub 204, 304 reduce a mass of the wheel hub 204, 304, and thereby reduce the rotational inertia of the turbine wheel 200, 300. By reducing the rotational inertia of the turbine wheel 200, 300, the period of time for the turbine wheel 200, 300 to reach an operating speed that results in improved power output for the internal combustion engine 124 (FIG. 1) is reduced. This reduction in a lag of the turbine wheel 200, 300 improves a response time of the internal combustion engine 124, which thereby improves operator satisfaction. It should be noted that the formation of the plurality of scallops 240, 340 may reduce an operating efficiency of the turbine wheel 200, 300. However, by forming the plurality of scallops 240, 340 such that the first radius 242 extends from the hub end 206' adjacent to the blade hub camber line 222 along or adjacent to the suction side 210 of the respective blade 202', the exhaust gas stream 120 (FIG. 1) is not reintroduced into the turbine wheel 200, 300. In this regard, as the suction side 212 is a low pressure side, the portion of the wall 220, 320 of the wheel hub 204, 304 that extends along or adjacent to the suction side 210 for the first circumferential distance 244 or the third circumferential distance 344, respectively, substantially inhibits the backflow of exhaust gas from the pressure side 210 to the low pressure suction side 212. This mitigates the loss in efficiency created by reducing the rotational inertia of the turbine wheel 200, 300 through defining the plurality of scallops 240, 340 in the wall 220, 320 of the wheel hub 204, 304.

It should be noted that while the plurality of scallops 240, 340 are described and illustrated herein as being extruded through the wall 220, 320 of the wheel hub 204, 304 at a particular illustrated depth, the present disclosure is not so limited. In this regard, with reference to FIG. 8A, one or more of the scallops 240, 340 may be extruded through the respective wall 220, 320 of the wheel hub 204, 304 such that the second minimum radius or the inner most periphery of the respective scallop 240, 340 has a different minimum radius relative to the outer periphery of the wall 220, 320. While the following examples refer to one of the scallops 240', it will be understood that any of the scallops 240' may be defined to have a different minimum radius relative to the wall 220 of the wheel hub 204, and moreover, one or more of the scallops 340' may be defined to have a different minimum radius relative to the wall 320 of the wheel hub 304.

Figure 8A:
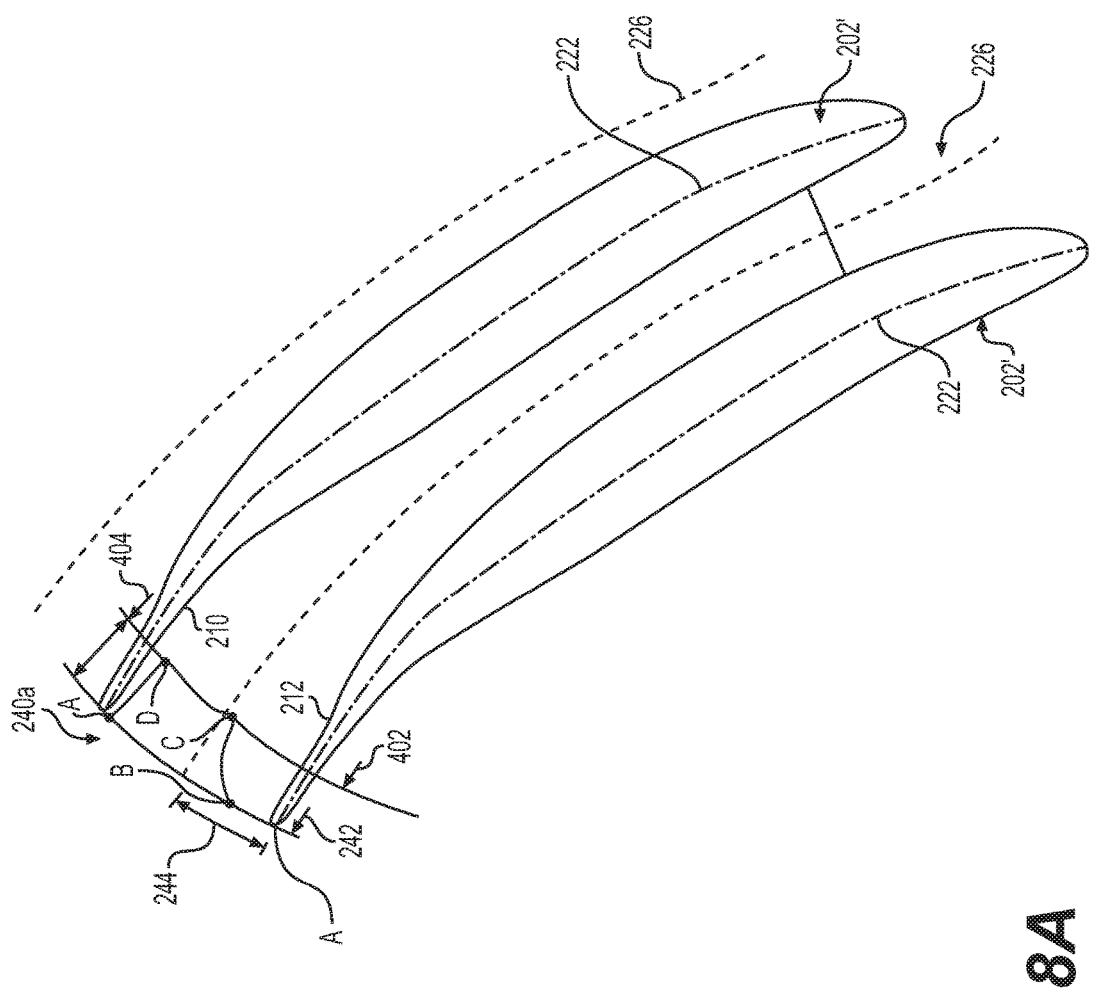
FIG. 8A is a blade-to-blade view of adjacent blade hub cross-sections that illustrates the scallop for the wheel hub of the turbine wheel of FIG. 1 defined at a shallow depth.

With reference to FIG. 8A, a shallow scallop 240a is shown. In one example, the scallop 240a is a curved two-dimensional shape defined between adjacent pairs of the blades 202', which is defined or extruded through the wall 220 to define the three-dimensional shape of the scallop 240a. In this example, the scallop 240a starts on the outermost periphery of the wall 220 of the wheel hub 204 a predefined peripheral distance away (i.e. the first circumferential distance 244) from the suction side 212, and the first circumferential distance 244 is defined to extend from the blade hub camber line 222 at point A and to extend toward the suction side 210 to terminate at point B. The shape of each of the scallops 240a drops from the point B to a second radius (second minimum radii) 402, which defines the inner most periphery of the scallop 240a. The second radius 402 is defined so as to be offset from the mid-line 226 between the blades 202' so that the inner most radius or the second radius 402 of the scallop 240a at point C is closer to the suction side 212 than to the pressure side 210. The scallop 240a also has the third radius (third minimum radii) 404 defined so as to be offset from the mid-line 226 toward the pressure side 210. The third radius 404 terminates at the point D. The second radius 402 and the third radius 404 are less than the first radius 242, and the first radius 242 is defined from the point A to the center line CL of the hub 230 (FIG. 4). In this example, the second radius 402 is about 10% of the first radius 242 to define the shallow scallop 240a.

Figure 8B:
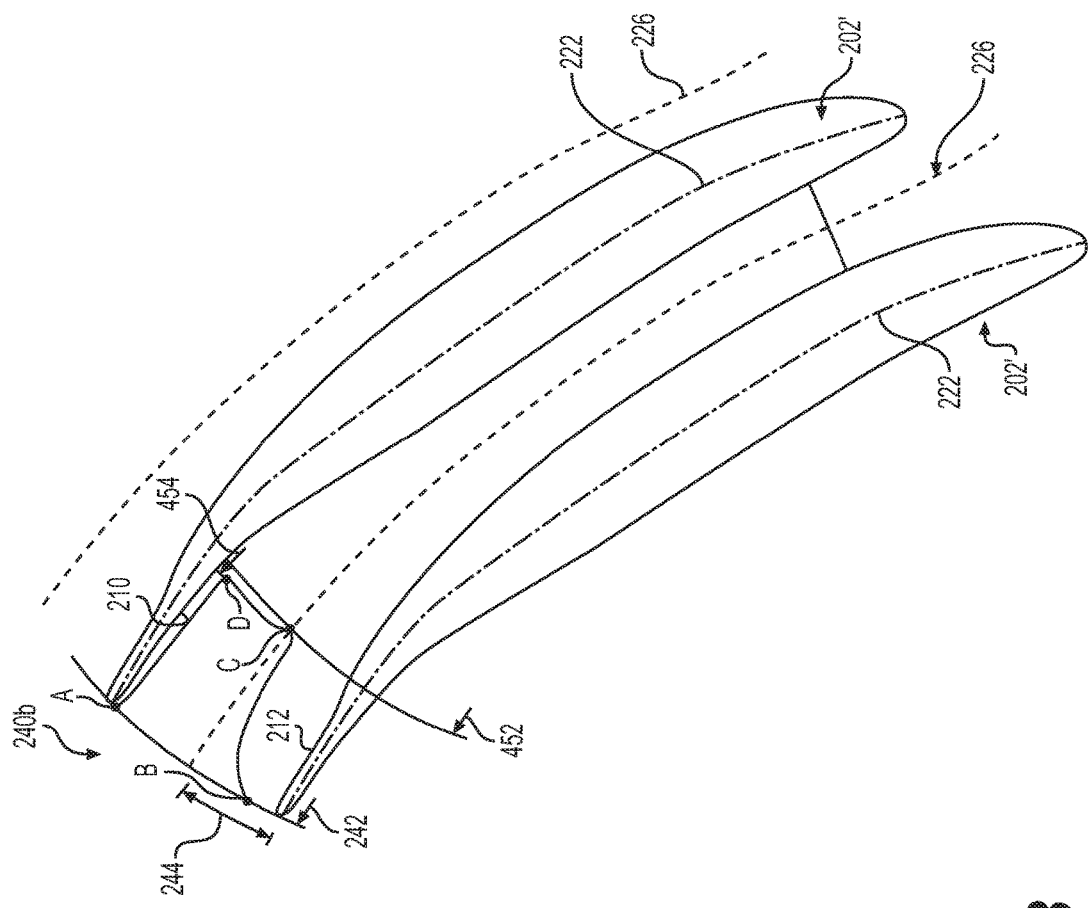
FIG. 8B is a blade-to-blade view of adjacent blade hub cross-sections that illustrates the scallop for the wheel hub of the turbine wheel of FIG. 1 defined at a medium depth.

With reference to FIG. 8B, a medium scallop 240b is shown. In one example, the scallop 240b is a curved two-dimensional shape defined between adjacent pairs of the blades 202', which is defined or extruded through the wall 220 to define the three-dimensional shape of the scallop 240b. In this example, the scallop 240b starts on the outermost periphery of the wall 220 of the wheel hub 204 a predefined peripheral distance away (i.e. the first circumferential distance 244) from the suction side 212, and the first circumferential distance 244 is defined to extend from the blade hub camber line 222 at point A and to extend toward the suction side 210 to terminate at point B. The shape of each of the scallops 240b drops from point B to a second radius (second minimum radii) 452, which defines the inner most periphery of the scallop 240b. The second radius 452 is defined so as to be offset from the mid-line 226 between the blades 202' so that the inner most radius or the second radius 452 of the scallop 240b at point C is closer to the suction side 212 than to the pressure side 210. The scallop 240b also has the third radius (third minimum radii) 454 defined so as to be offset from the mid-line 226 toward the pressure side 210. The third radius 454 terminates at point D. The second radius 452 and the third radius 454 are less than the first radius 242, and the first radius 242 is defined from point A to the center line CL of the hub 230 (FIG. 4). In this example, the second radius 452 is about 25% of the first radius 242 to define the medium scallop 240b.

Figure 8C:
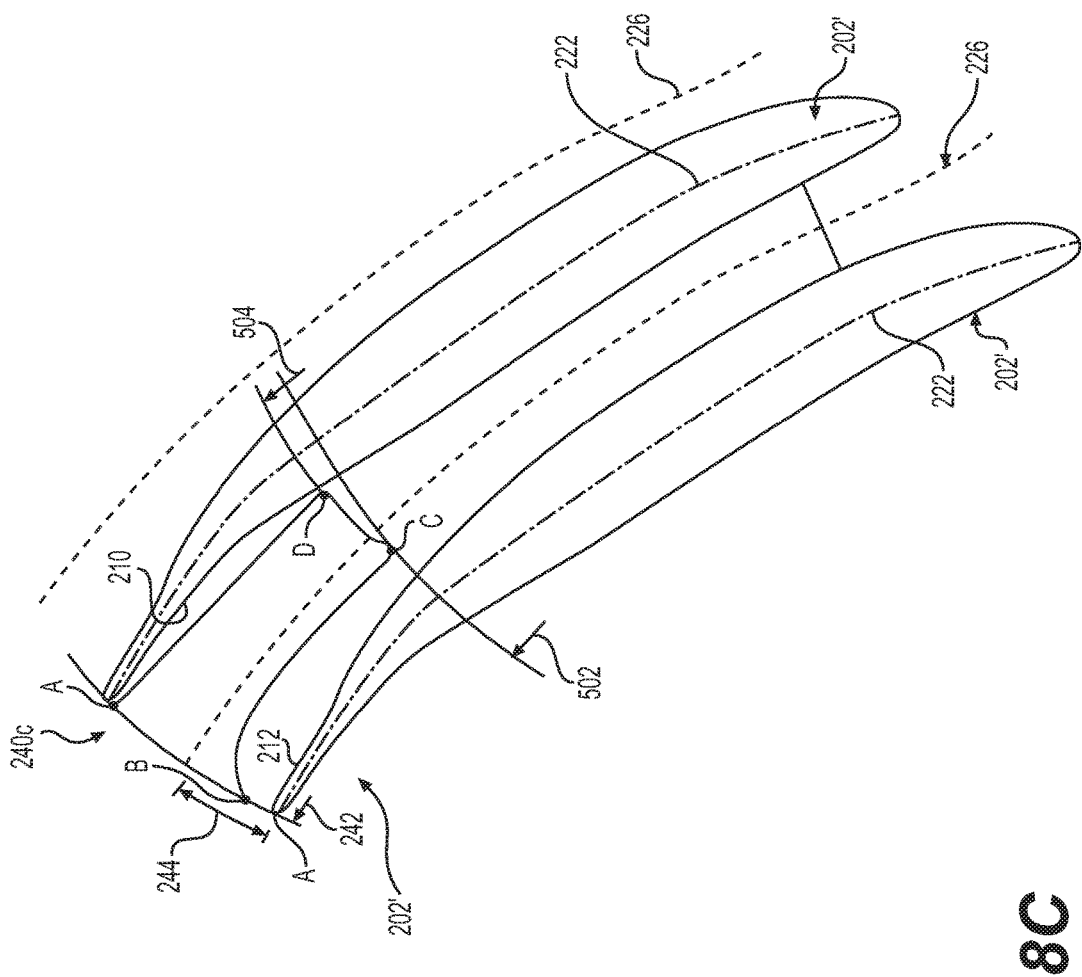
FIG. 8C is a blade-to-blade view of adjacent blade hub cross-sections that illustrates the scallop for the wheel hub of the turbine wheel of FIG. 1 defined at a deep depth.

With reference to FIG. 8C, a deep scallop 240c is shown. In one example, the scallop 240c is a curved two-dimensional shape defined between adjacent pairs of the blades 202', which is defined or extruded through the wall 220 to define the three-dimensional shape of the scallop 240c. In this example, the scallop 240c starts on the outermost periphery of the wall 220 of the wheel hub 204 a predefined peripheral distance away (i.e. the first circumferential distance 244) from the suction side 212, and the first circumferential distance 244 is defined to extend from the blade hub camber line 222 at point A and to extend toward the suction side 210 to terminate at point B. The shape of each of the scallops 240c drops from point B to a second radius (second minimum radii) 502, which defines the inner most periphery of the scallop 240c. The second radius 502 is defined so as to be offset from the mid-line 226 between the blades 202' so that the inner most radius or the second radius 502 of the scallop 240c at point C is closer to the suction side 212 than to the pressure side 210. The scallop 240c also has the third radius (third minimum radii) 504 defined so as to be offset from the mid-line 226 toward the pressure side 210. The third radius 454 terminates at point D. The second radius 502 and the third radius 504 are less than the first radius 242, and the first radius 242 is defined from point A to the center line CL of the hub 230 (FIG. 4). In this example, the second radius 452 is about 50% of the first radius 242 to define the deep scallop 240c.

It should be noted that while the plurality of scallops 240, 340 are described and illustrated herein as being defined through the wall 220, 320 of the wheel hub 204, 304 along the axis A' (FIG. 2) substantially parallel to the center line CL of the hub 230, the present disclosure is not so limited. In this regard, with reference to FIG. 9A, one or more of the scallops 240, 340 may be defined through the wall 220, 320 at an angle relative to the respective wall 220, 320 of the wheel hub 204, 304. While the following examples refer to one of the scallops 240', it will be understood that any of the scallops 240' may be defined at an angle relative to the wall 220 of the wheel hub 204, and moreover, one or more of the scallops 340' may be defined at an angle relative to the wall 320 of the wheel hub 304.

Figure 9A:
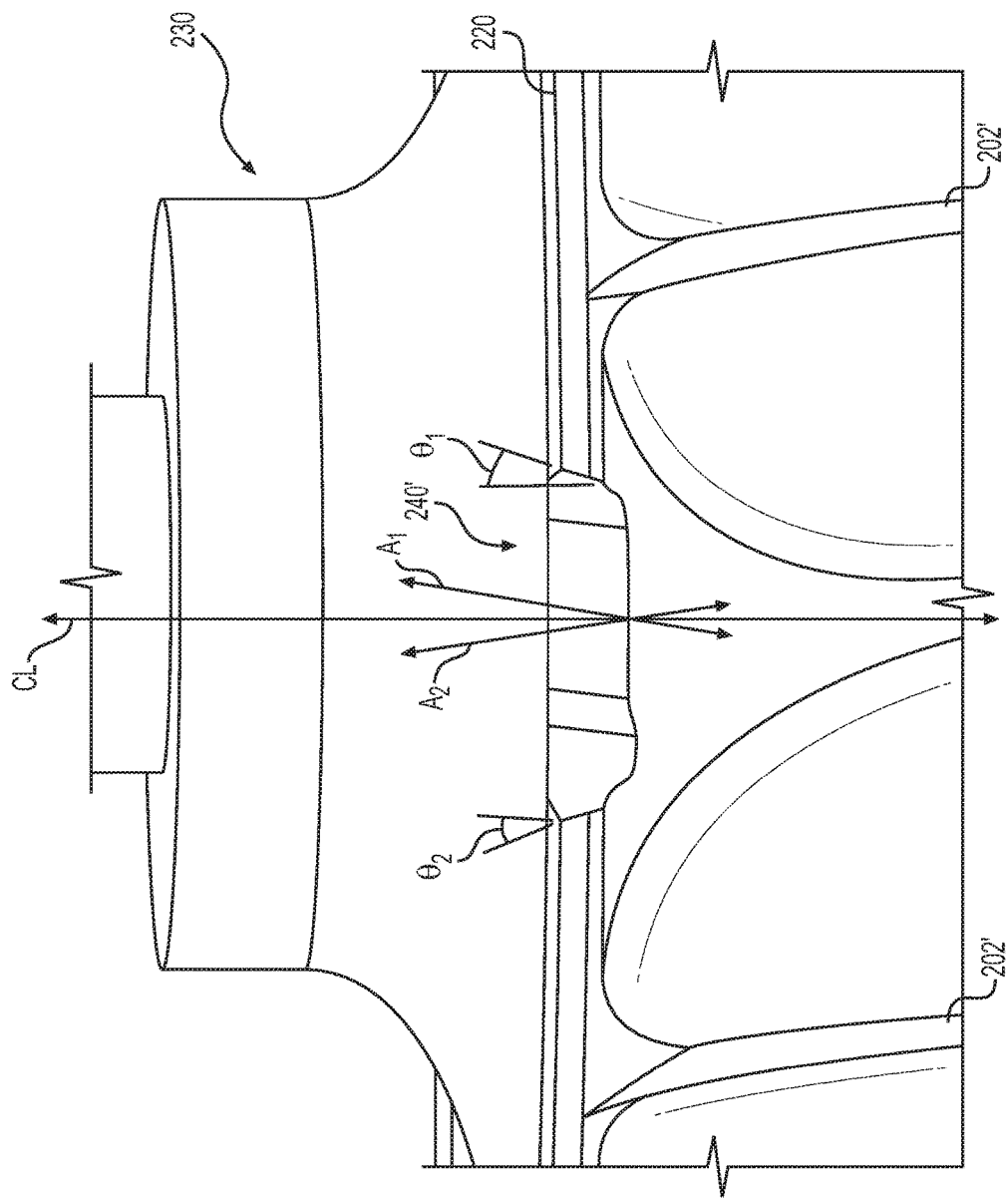
FIG. 9A is a detail perspective view of the scallop of FIG. 5 defined through the wheel hub of the turbine wheel of FIG. 1 at a first offset angle and a second offset angle relative to a center line of the wheel hub.

With reference to FIG. 9A, the scallop 240' is defined through the wall 220 of the wheel hub 204 at a first offset angle $\theta_1$ to the center line CL of the hub 230 and a second offset angle $\theta_2$ to the center line CL of the hub 230. In one example, $\theta_1$ is about negative zero degrees to about negative 60 degrees, and $\theta_2$ is about positive zero degrees to about positive 60 degrees to define the scallop 240'. Thus, the two-dimensional shape that defines the scallop, such as the scallop 240', need not be defined through the wall 220 of the wheel hub 204 along an axis that is substantially parallel to the center line CL of the hub 230 to define the three-dimensional shape of the scallop 240'. Rather, the scallop 240' may be defined through the wall 220 of the wheel hub 204 along an axis A2 and an axis A3, which are each substantially oblique to the center line CL of the hub 230.

With reference to FIG. 9B, the scallop 240' is defined through the wall 220 of the wheel hub 204 at a first offset angle $\theta_3$ to the center line CL of the hub 230 and a second offset angle $\theta_4$ to the center line CL of the hub 230. In one example, $\theta_3$ is about positive zero degrees to about positive 60 degrees, and $\theta_4$ is about positive zero degrees to about positive 60 degrees to define the scallop 240'. Thus, the two-dimensional shape that defines the scallop, such as the scallop 240', need not be defined through the wall 220 of the wheel hub 204 along an axis that is substantially parallel to the center line CL of the hub 230 to define the three-dimensional shape of the scallop 240'. Rather, the scallop 240' may be defined through the wall 220 of the wheel hub 204 along an axis A4, which is substantially oblique to the center line CL of the hub 230.

Figure 9C:
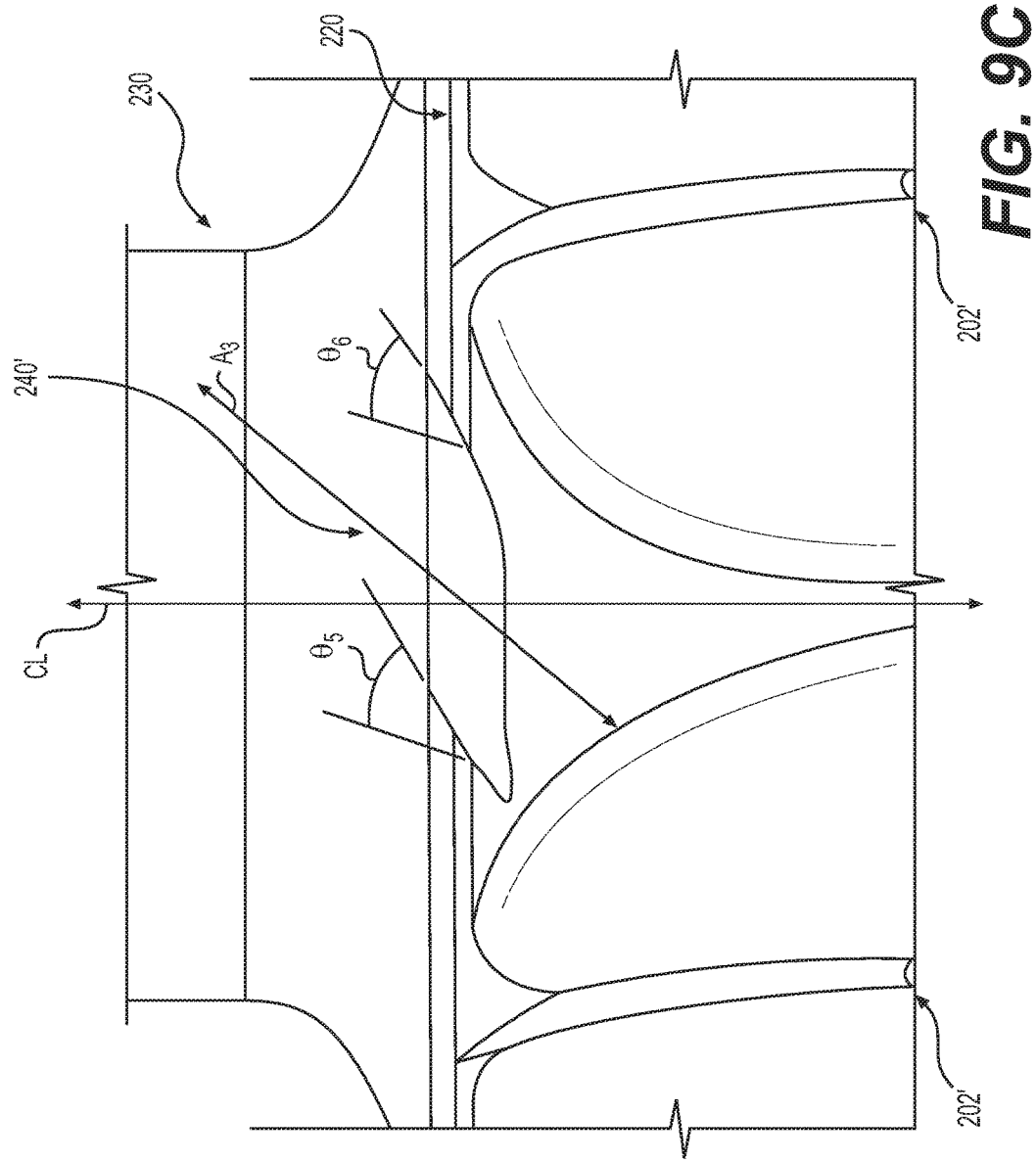
FIG. 9C is detail perspective view of the scallop of FIG. 5 defined through the wheel hub of the turbine wheel of FIG. 1 at a fifth offset angle and a sixth offset angle relative to a center line of the wheel hub.

With reference to FIG. 9C, the scallop 240' is defined through the wall 220 of the wheel hub 204 at a first offset angle $\theta_5$ to the center line CL of the hub 230 and a second offset angle $\theta_6$ to the center line CL of the hub 230. In one example, $\theta_5$ is about negative zero degrees to about negative 60 degrees, and $\theta_6$ is about negative zero degrees to about negative 60 degrees to define the scallop 240'. Thus, the two-dimensional shape that defines the scallop, such as the scallop 240', need not be defined through the wall 220 of the wheel hub 204 along an axis that is substantially parallel to the center line CL of the hub 230 to define the three-dimensional shape of the scallop 240'. Rather, the scallop 240' may be defined through the wall 220 of the wheel hub 204 along an axis A5, which is substantially oblique to the center line CL of the hub 230.

Figure 10A:
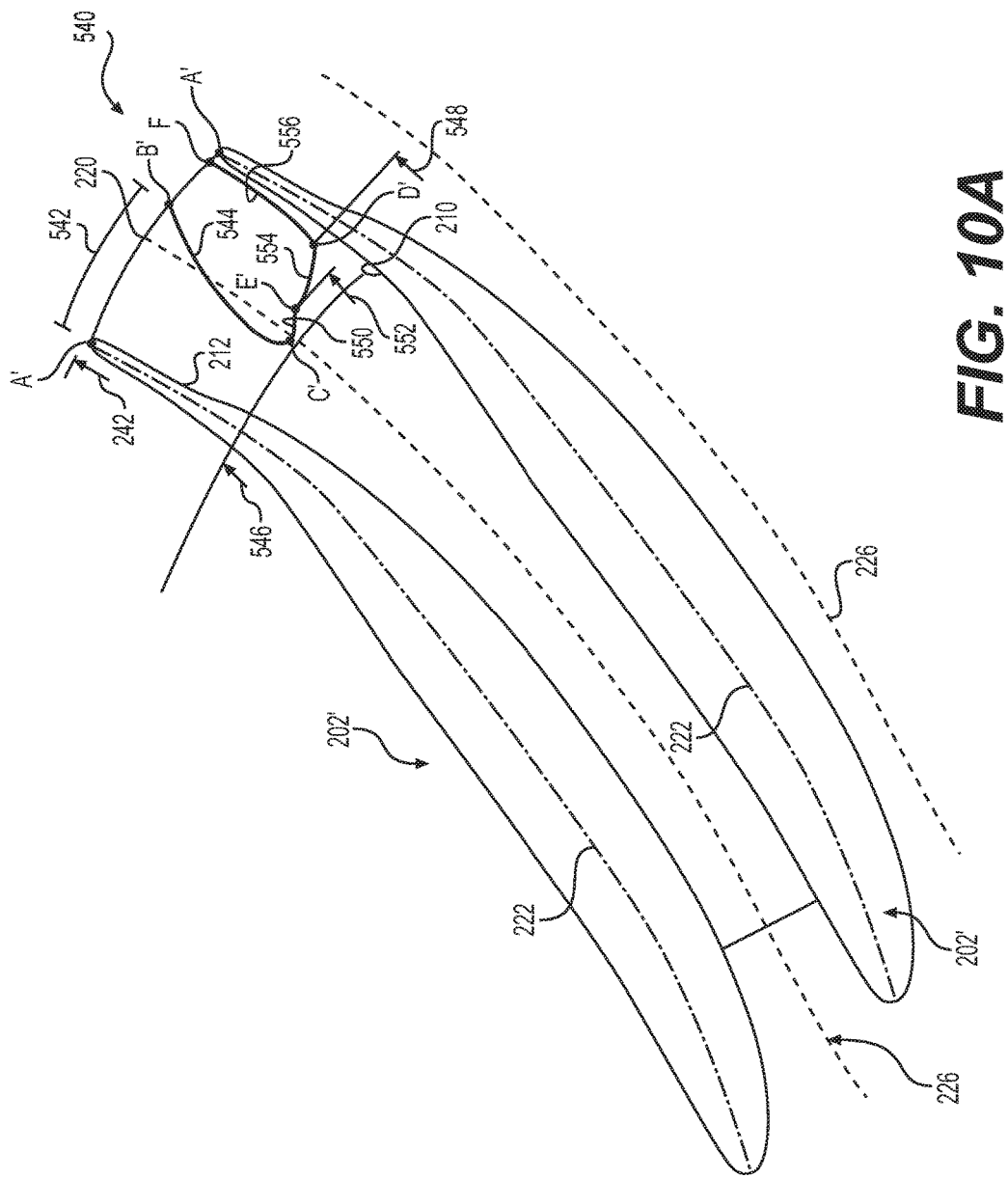
FIG. 10A is a blade-to-blade view of adjacent blade hub cross-sections of the turbine wheel similar to the turbine wheel of FIG. 1, which illustrates another exemplary shape for a scallop.

It should also be noted that the present disclosure is not limited to the shape of the plurality of scallops 240, 340, discussed and illustrated with regard to FIGS. 1-9C. In this regard, with reference to FIG. 10A, one scallop 540 of a plurality of scallops is shown. As the scallop 540 may be similar to the scallop 240' of the plurality of scallops 240 described for use with the turbine wheel 200 of FIGS. 1-5, the same reference numerals will be used to denote the same or similar components. In this example, the scallop 540 may be defined through the wall 220 of the wheel hub 204 of the turbine wheel 200, and may also be employed with the turbocharger 100 of FIG. 1.

In one example, the scallop 540 is defined as a curved two-dimensional shape defined between adjacent pairs of the blades 202', which is extruded or defined through the wall 220 of the wheel hub 204 to arrive at the three-dimensional shape of the scallop 540. Generally, the scallop 540 is formed within the wall 220 of the wheel hub 204 via investment casting, etc. In this example, the scallop 540 starts on the outermost periphery of the wall 220 a predefined peripheral distance away (i.e. a circumferential distance 542) from the suction side 212, and the circumferential distance 542 is defined to extend from the blade hub camber line 222 at point A' and extend towards the suction side 210 to terminate at point B'. The scallop 540 transitions from the point B' to point C' via a curved or arcuate line 544. The shape of each of the scallops 540 drops from point B' to a second radius (second minimum radii) 546 at point C', which defines the inner most periphery of the scallop 540. In this example, point B' is closer to the suction side 210, while point C' is closer to the pressure side 212 relative to the mid-line 226. The second radius 546 is defined so as to be offset from the mid-line 226 between the blades 202' so that the inner most radius or the second radius 546 of the scallop 540 at point C' is closer to the suction side 212 than to the pressure side 210.

The scallop 540 has a third radius (third minimum radii) 548 defined so as to be offset from the mid-line 226 toward the pressure side 210. The third radius 548 terminates at point D'. The second radius 546 and the third radius 548 are less than the first radius 242, which is defined from point A' to the center line CL of the hub 230. The scallop 540 transitions from the point C' to a point E via a sloped line 550. The sloped line 550 crosses the mid-plane 224. The point E is at a fourth radius (fourth radii) 552, which is greater than the second radius 546 and less than the third radius 548. The fourth radius 552 is less than the first radius 242. The scallop 540 transitions from the point E to the point D via a sloped line 554. The point D' transitions to a point F via a line 556 that extends radially outward from the point D' such that the line 556 is substantially planar.

Figure 10B:
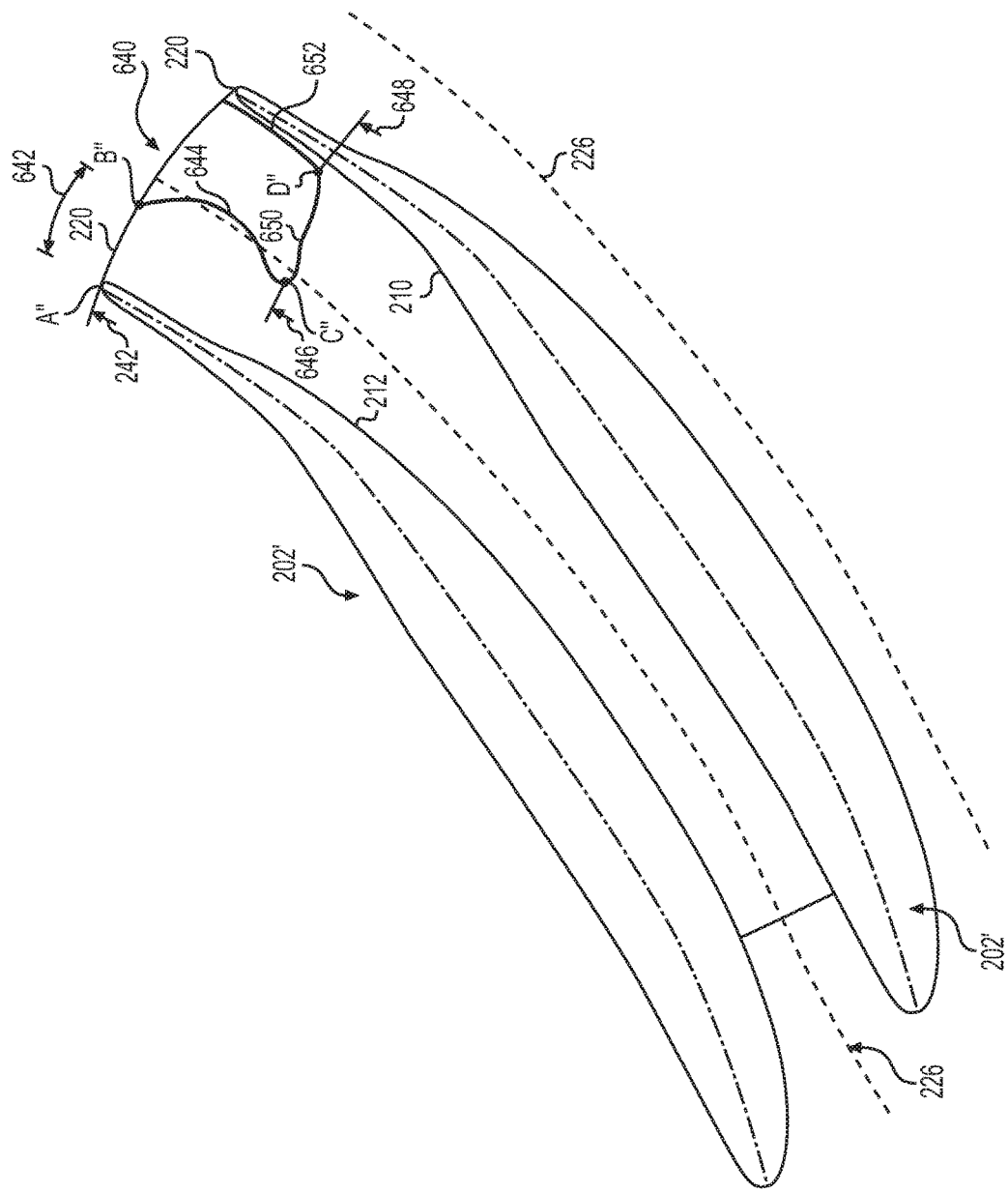
FIG. 10B is a blade-to-blade view of adjacent blade hub cross-sections of the turbine wheel similar to the turbine wheel of FIG. 1, which illustrates another exemplary shape for a scallop.

In another example, with reference to FIG. 10B, one scallop 640 of a plurality of scallops is shown. As the scallop 640 may be similar to the scallop 240' described for use with the turbine wheel 200 of FIGS. 1-5, the same reference numerals will be used to denote the same or similar components. In this example, the scallop 640 may be defined through the wall 220 of the wheel hub 204 of the turbine wheel 200, and may also be employed with the turbocharger 100 of FIG. 1.

In one example, the scallop 640 is defined as a curved two-dimensional shape defined between adjacent pairs of the blades 202', which is extruded or defined through the wall 220 of the wheel hub 204 to arrive at the three-dimensional shape of the scallop 640. Generally, the scallop 640 is formed within the wall 220 of the wheel hub 204 via investment casting, etc. In this example, the scallop 640 starts on the outermost periphery of the wall 220 a predefined peripheral distance away (i.e. a circumferential distance 642) from the suction side 212, and the circumferential distance 642 is defined to extend from the blade hub camber line 222 at point A" and extend towards the suction side 210 to terminate at point B". The scallop 640 transitions from the point B" to the point C" via a curved or arcuate line 644. The shape of each of the scallops 640 drops from point B" to a second radius (second minimum radii) 646 at point C", which defines the inner most periphery of the scallop 640. In this example, point B" and point C" are closer to the suction side 210 relative to the mid-line 226. The second radius 646 is defined so as to be offset from the mid-line 226 between the blades 202' so that the inner most radius or the second radius 646 of the scallop 640 at point C" is closer to the suction side 212 than to the pressure side 210.

The scallop 640 has a third radius (third minimum radii) 648 defined so as to be offset from the mid-line 226 toward the pressure side 210. The third radius 648 terminates at point D". The second radius 646 and the third radius 648 are less than the first radius 242, which is defined from point A" to the center line CL of the hub 230. The scallop 640 transitions from the point C" to the point D" via a sloped line 650. The point D" transitions to point A" via a line 652 that extends radially outward from the point D" such that the line 652 is substantially planar.

Figure 10C:
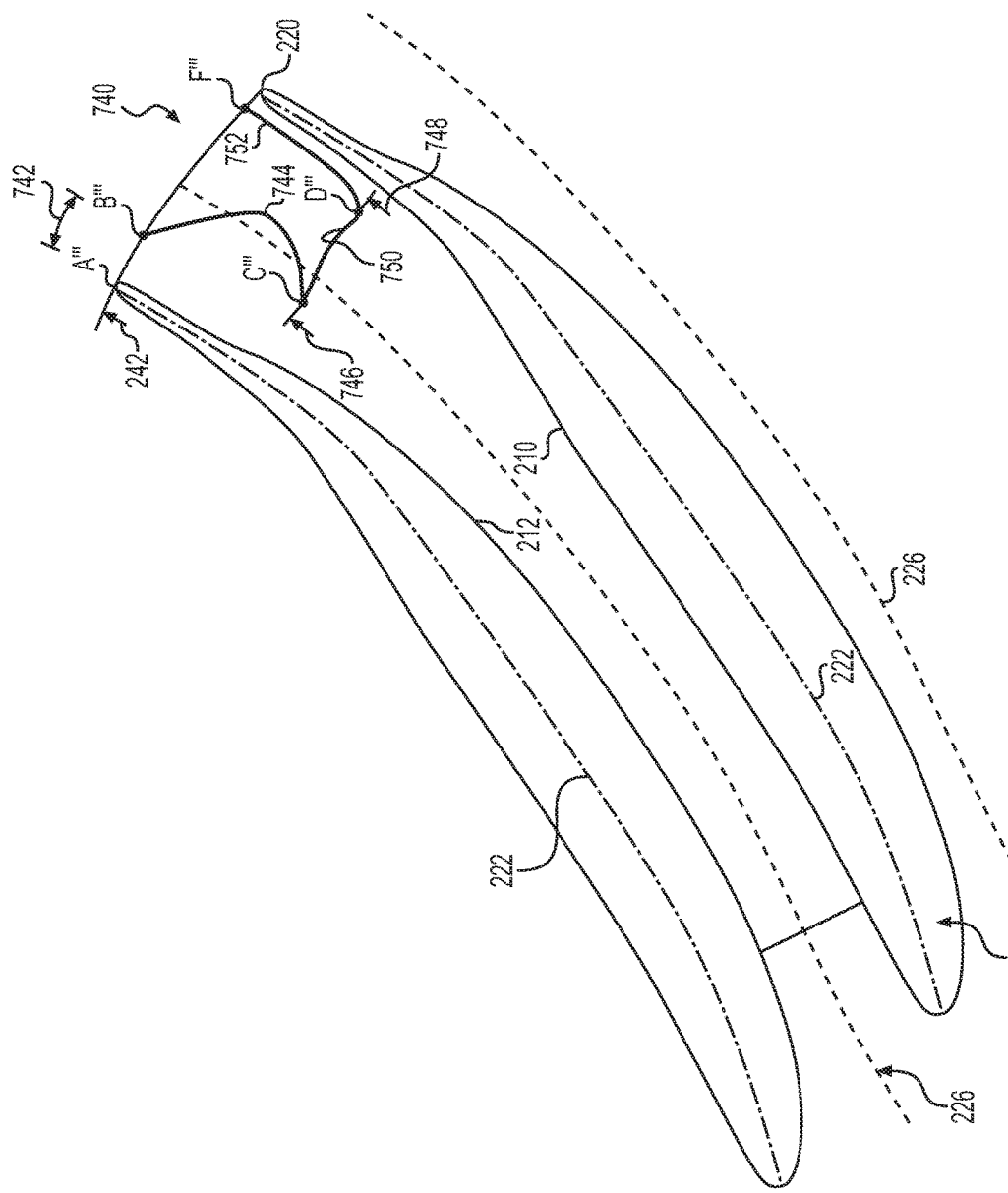
FIG. 10C is a blade-to-blade view of adjacent blade hub cross-sections of the turbine wheel similar to the turbine wheel of FIG. 1, which illustrates another exemplary shape for a scallop.

In another example, with reference to FIG. 10C, one scallop 740 of a plurality of scallops is shown. As the scallop 740 may be similar to the scallop 240' described for use with the turbine wheel 200 of FIGS. 1-5, the same reference numerals will be used to denote the same or similar components. In this example, the scallop 740 may be defined through the wall 220 of the wheel hub 204 of the turbine wheel 200, and may also be employed with the turbocharger 100 of FIG. 1.

In one example, the scallop 740 is defined as a curved two-dimensional shape defined between adjacent pairs of the blades 202', which is extruded or defined through the wall 220 of the wheel hub 204 to arrive at the three-dimensional shape of the scallop 740. Generally, the scallop 740 is formed within the wall 220 of the wheel hub 204 via investment casting, etc. In this example, the scallop 740 starts on the outermost periphery of the wall 220 a predefined peripheral distance away (i.e. circumferential distance 742) from the suction side 212, and the circumferential distance 742 is defined to extend from the blade hub camber line 222 at point A'" and extend towards the suction side 210 to terminate at point B'". The scallop 740 transitions from the point B''' to the point C''' via a curved or arcuate line 744. The shape of each of the scallops 740 drops from point B''' to a second radius (second minimum radii) 746 at point C''', which defines the inner most periphery of the scallop 740. In this example, point B''' and point C''' are closer to the suction side 210 relative to the mid-line 226. The second radius 746 is defined so as to be offset from the mid-line 226 between the blades 202' so that the inner most radius or the second radius 746 of the scallop 740 at point C''' is closer to the suction side 212 than to the pressure side 210.

The scallop 740 has a third radius (third minimum radii) 748 defined so as to be offset from the mid-line 226 toward the pressure side 210. The third radius 748 terminates at point D'''. The second radius 746 and the third radius 748 are less than the first radius 242, which is defined from point A''' to the center line CL of the hub 230. The scallop 740 transitions from the point C''' to the point D''' via a sloped line 750. The point D''' transitions to point F''' via a line 752 that extends radially outward from the point D''' such that the line 752 is substantially planar.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A turbine wheel for a turbocharger, comprising:
a plurality of blades each having a pressure side and a suction side, each of the plurality of blades coupled to a wheel hub along a root of the blade such that the pressure side of each one of the plurality of blades faces the suction side of another one of the plurality of blades about the wheel hub, with a mid-plane defined between the pressure side and the suction side of adjacent ones of the plurality of blades, each of the plurality of blades has a leading edge that terminates at a wall of the wheel hub, each of the plurality of blades coupled to the wheel hub along a respective blade hub camber line, the wall having a first radius at the leading edge of each of the plurality of blades that extends for a first circumferential distance adjacent to the suction side of each of the plurality of blades, the first circumferential distance is at least 12% of a circumferential distance that extends between the adjacent ones of the plurality of blades; and
the wheel hub includes a plurality of scallops defined through the wall of the wheel hub between the adjacent ones of the plurality of blades, with each of the plurality of scallops asymmetrical about the mid-plane, and for each of the plurality of scallops, the wall of the wheel hub has a second minimum radius defined offset from the mid-plane toward the suction side of a respective one of the plurality of blades and a third minimum radius defined offset from the mid-plane toward the pressure side of another one of the plurality of blades, with the second minimum radius less than the third minimum radius and the first radius.

2. The turbine wheel of claim 1, wherein the wall has a fourth radius defined between the second minimum radius and the third minimum radius, the fourth radius greater than the second minimum radius and the third minimum radius, and less than the first radius.

3. The turbine wheel of claim 2, wherein each of the plurality of scallops is defined by a plurality of segments, which cooperate to transition from the first radius to the second minimum radius, from the second minimum radius to the fourth radius, from the fourth radius to the third minimum radius and the third minimum radius to the first radius along the wall of the wheel hub.

4. The turbine wheel of claim 3, wherein the plurality of segments includes a first segment that transitions from the first radius to the second minimum radius and the first segment is offset from the mid-plane toward the suction side.

5. The turbine wheel of claim 4, wherein the first segment is arcuate.

6. The turbine wheel of claim 3, wherein the plurality of segments includes a second segment that transitions from the second minimum radius to the fourth radius and the second segment is offset from the mid-plane toward the suction side.

7. The turbine wheel of claim 6, wherein the second segment has an inclined surface.

8. The turbine wheel of claim 3, wherein the plurality of segments includes a third segment that transitions from the fourth radius to the third minimum radius, the third segment crosses the mid-plane and the third segment has a sloped surface.

9. The turbine wheel of claim 3, wherein the plurality of segments includes a fourth segment that transitions from the fourth radius to the first radius, the fourth segment is offset from the mid-plane toward the pressure side and the fourth segment is substantially planar.

10. The turbine wheel of claim 1, wherein the plurality of scallops are defined through the wall of the wheel hub along an axis substantially parallel to a center line of the wheel hub.

11. The turbine wheel of claim 1, wherein the plurality of scallops are defined through the wall of the wheel hub along an axis that is substantially oblique to a center line of the wheel hub.

12. The turbine wheel of claim 1, wherein the wall extends from the leading edge of the plurality of blades adjacent to the suction side toward the mid-plane at the first radius for the first circumferential distance, which is less than 50% of a second circumferential distance defined between the blade hub camber line of each of the plurality of blades along the suction side and the mid-plane of the each of the plurality of blades.

13. The turbine wheel of claim 1, wherein the wall extends from the leading edge of the plurality of blades adjacent to the suction side toward the mid-plane at the first radius for the first circumferential distance, which is less than 120% of a second circumferential distance defined between the blade hub camber line of each of the plurality of blades along the suction side and the mid-plane of each of the plurality of blades.

14. A turbine wheel for a turbocharger, comprising:
a plurality of blades each having a pressure side and a suction side, each of the plurality of blades coupled to a wheel hub along a root of the blade such that the pressure side of each one of the plurality of blades faces the suction side of another one of the plurality of blades about the wheel hub, with a mid-plane defined between the pressure side and the suction side of adjacent ones of the plurality of blades, each of the plurality of blades has a leading edge that terminates at a wall of the wheel hub, each of the plurality of blades coupled to the wheel hub along a respective blade hub camber line, the wall having a first radius at the leading edge of each of the plurality of blades, the wall extends from the leading edge of each of the plurality of blades adjacent to the suction side toward the mid-plane at the first radius for a first circumferential distance, which is less than 120% of a second circumferential distance defined between the blade hub camber line of each of the plurality of blades along the suction side and the mid-plane of each of the plurality of blades and the first circumferential distance is at least 12% of a circumferential distance that extends between the adjacent ones of the plurality of blades; and the wheel hub includes a plurality of scallops defined through the wall of the wheel hub between the adjacent ones of the plurality of blades, with each of the plurality of scallops asymmetrical about the mid-plane, and for each of the plurality of scallops, the wall of the wheel hub has a second minimum radius defined offset from the mid-plane toward the suction side of a respective one of the plurality of blades and a third minimum radius defined offset from the mid-plane toward the pressure side of another one of the plurality of blades, with the second minimum radius less than the third minimum radius and the first radius, wherein the wall has a fourth radius defined between the second minimum radius and the third minimum radius, the fourth radius greater than the second minimum radius and the third minimum radius, and less than the first radius.

15. The turbine wheel of claim 14, wherein each of the plurality of scallops is defined by a plurality of segments, which cooperate to transition from the first radius to the second minimum radius, from the second minimum radius to the fourth radius, from the fourth radius to the third minimum radius and the third minimum radius to the first radius along the wall of the wheel hub.

16. The turbine wheel of claim 15, wherein the plurality of segments includes a first segment that transitions from the first radius to the second minimum radius and the first segment is offset from the mid-plane toward the suction side.

17. The turbine wheel of claim 15, wherein the plurality of segments includes a second segment that transitions from the second minimum radius to the fourth radius and the second segment is offset from the mid-plane toward the suction side.

18. The turbine wheel of claim 15, wherein the plurality of segments includes a third segment that transitions from the fourth radius to the third minimum radius and the third segment crosses the mid-plane.

19. The turbine wheel of claim 15, wherein the plurality of segments includes a fourth segment that transitions from the fourth radius to the first radius and the fourth segment is offset from the mid-plane toward the pressure side.

* * * * *